United States Patent
Mezzacca

(10) Patent No.: US 11,481,803 B2
(45) Date of Patent: *Oct. 25, 2022

(54) SYSTEM AND METHOD OF AUTOMATED DELIVERY OF RELEVANCE-CHECKED BENEFIT-CONVEYING CODES DURING ONLINE TRANSACTION

(71) Applicant: Marc Mezzacca, New York, NY (US)

(72) Inventor: Marc Mezzacca, New York, NY (US)

(73) Assignee: NextGen Shopping LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/680,466

(22) Filed: Nov. 11, 2019

(65) Prior Publication Data

US 2020/0286123 A1    Sep. 10, 2020

Related U.S. Application Data

(63) Continuation of application No. 15/671,169, filed on Aug. 8, 2017, now Pat. No. 10,475,071, which is a continuation of application No. 14/060,596, filed on Oct. 22, 2013, now Pat. No. 9,727,891.

(60) Provisional application No. 61/717,101, filed on Oct. 22, 2012, provisional application No. 61/802,073, filed on Mar. 15, 2013.

(51) Int. Cl.
    *G06Q 30/02* (2012.01)
    *G06Q 20/38* (2012.01)

(52) U.S. Cl.
    CPC ....... *G06Q 30/0253* (2013.01); *G06Q 20/387* (2013.01); *G06Q 30/02* (2013.01)

(58) Field of Classification Search
    CPC .. G06Q 30/02; G06Q 30/0253; G06Q 20/387; G06Q 30/0207–30/0277
    See application file for complete search history.

(56) References Cited

U.S. PATENT DOCUMENTS

| 5,250,789 A * | 10/1993 | Johnsen ................ B62B 3/1424 |
| | | 705/14.4 |
| 2003/0192026 A1* | 10/2003 | Szepesvary ............... G06F 8/30 |
| | | 718/100 |
| 2006/0101119 A1* | 5/2006 | Qureshi .................. H04L 51/04 |
| | | 709/206 |

(Continued)

*Primary Examiner* — Thuy N Nguyen
(74) *Attorney, Agent, or Firm* — Jundong Ma

(57) ABSTRACT

A system and method of performing in-context of automated delivery of benefit-conveying (BC) code of an e-commerce website is provided. The system comprises means for identifying a BC code input field in a BC context of the e-commerce website, means for storing a plurality of BC code collections for supported e-commerce websites, and means for acquiring information about relevance-checked BC codes of the e-commerce web site. The system comprises means for displaying an UI panel in an vicinity of the identified BC code input field, with the UI panel configured to list information about the acquired relevance-checked BC codes in such a manner that an individual BC code from among the acquired BC codes can be selected through selecting a UI entry listing information about the individual BC code. The system comprises means for inputting the selected individual BC code into the identified BC code input field.

12 Claims, 12 Drawing Sheets

(56) References Cited

U.S. PATENT DOCUMENTS

| | | | | |
|---|---|---|---|---|
| 2006/0206376 A1* | 9/2006 | Gibbs | ................ | G06Q 30/0236 705/14.27 |
| 2007/0073580 A1* | 3/2007 | Perry | ................ | G06Q 30/02 705/26.1 |
| 2007/0226650 A1* | 9/2007 | Hintermeister | ........ | G06F 3/048 715/822 |
| 2009/0183090 A1* | 7/2009 | Fujimoto | ............ | G06F 40/174 715/780 |
| 2010/0010987 A1* | 1/2010 | Smyth | ................ | G06F 16/9535 707/E17.014 |
| 2010/0057573 A1* | 3/2010 | Singhal | ............ | G06Q 30/0267 705/14.64 |
| 2011/0153401 A1* | 6/2011 | Jellema | ................ | G06Q 30/02 705/14.26 |
| 2011/0178867 A1* | 7/2011 | King | ................ | G06Q 30/0239 705/14.44 |
| 2011/0231224 A1* | 9/2011 | Winters | ................ | G06Q 30/06 705/7.29 |
| 2012/0029998 A1* | 2/2012 | Aversano | ........... | G06Q 30/0226 705/14.1 |
| 2012/0215638 A1* | 8/2012 | Bennett | ............ | G06Q 30/0613 705/14.66 |
| 2012/0253895 A1* | 10/2012 | Bennett | ............ | G06Q 30/0235 705/14.1 |
| 2013/0085807 A1* | 4/2013 | Cincotta | ........... | G06Q 30/0203 705/7.32 |
| 2013/0188217 A1* | 7/2013 | Kluth | ................ | G06F 3/1288 358/1.14 |
| 2013/0226952 A1* | 8/2013 | Lal | ................ | G06F 40/143 707/767 |
| 2013/0332253 A1* | 12/2013 | Shiffert | ............ | G06Q 30/0255 705/14.26 |
| 2014/0074584 A1* | 3/2014 | Fisher | ................ | G06Q 30/0207 705/14.39 |
| 2018/0121945 A1* | 5/2018 | Shiffert | ............ | G06Q 30/0222 |

* cited by examiner

Code Snippet 1 http://couponwebserverexample.com/loadXML?site=macys.com

Code Snippet 2

```
<iframe type="content" frameborder="0" scrolling="no" src="https://couponwebserverexample.com/loadOUT?site=macys.com"
height="120px" style="width: 405px; display: block; visibility: visible;"></iframe>
```

Code Snippet 3

```
//Set the listener
chrome.extension.onRequest.addListener(requestHandler);

//Handle requests when listener is fired
function requestHandler(request, sender, sendResponse) {
  log('requestHandler call = ' + request.call);
  if (request.call == "pasteCoupon") {
    pasteCoupon(request.arg);
  }
}

//Automatically input the coupon code on click
function pasteCoupon(data) {
  chrome.tabs.getSelected(null, function (tab) {
    chrome.tabs.sendMessage(tab.id, data);
  });
}

//Function attached through JavaScript to each HTML coupon row in the iframe
function pasteCoupon(event) {
  chrome.extension.sendRequest({
    call: "pasteCoupon",
    arg: data
  });
};
```

Code Snippet 4

```
//CSS selector of Iframe rows containing coupon code
var codeSelector = '#tab-coupons tr.coderow';

//Iterate over all coupon codes to add paste coupon event handlers
$(codeSelector).each(function (index) {
  //Adds the paste coupon event handler to each row to be fired on Click
  $(this).click(function (event) {
    pasteCoupon(event);
  });
});
```

FIG. 7F

SYSTEM AND METHOD OF AUTOMATED DELIVERY OF RELEVANCE-CHECKED BENEFIT-CONVEYING CODES DURING ONLINE TRANSACTION

CROSS-REFERENCE TO RELATED APPLICATION

This application is a continuation application claiming priority under 35 U.S.C. § 120 to U.S. Non-provisional patent application Ser. No. 15/671,169, filed on Aug. 8, 2017, which is a continuation application claiming priority under 35 U.S.C. § 120 to U.S. Non-provisional patent application Ser. No. 14/060,596, filed on Oct. 22, 2013, now U.S. Pat. No. 9,727,891, which claims the benefit under 35 U.S.C. § 119(e) of Provisional Patent Application No. 61/717,101, filed Oct. 22, 2012 and Provisional Patent Application No. 61/802,073, filed Mar. 15, 2013. The entire disclosures of all of the aforesaid applications are hereby incorporated by reference.

BACKGROUND

1. Technical Field

The present disclosure relates to the technical field of providing and aggregating electronic commerce ("e-commerce") benefit-conveying codes. More particularly, the present disclosure relates to a system and method of in-context automated delivery of e-commerce benefit-conveying codes during an online transaction.

2. Description of the Related Art

E-commerce companies often use benefit-conveying codes to encourage consumers to purchase specific products or to conduct a transaction on their website. Examples of benefit-conveying codes include coupon codes, discount codes, voucher codes, promotional codes, key codes, and so forth. One form of these benefit-conveying codes is alpha-numerical text that can be entered into an input box during a stage or context of an online transaction, such as a shopping cart or a checkout stage on an e-commerce website. For the ease of discussion, hereinafter, Applicant uses "coupon codes" as examples of benefit-conveying codes to discuss issues applicable to benefit-conveying codes as existed in the conventional art. Conventionally, coupon codes can be obtained through e-commerce websites, email newsletters, social media, printed or mailed materials, or through coupon websites or blogs. Consumers often spend considerable amounts of time searching for coupon codes, which often occurs during their checkout process, directly before finalizing an online purchase.

Consumers often elect to utilize a search engine, such as Google®, to search for coupon codes. Most often coupon code directories will be found in these search results. In an attempt to address consumer need for locating coupons, large coupon directory websites, known as coupon aggregator websites, such as RetailMeNot® have attempted to aggregate and list valid coupons for many e-commerce websites across the Internet. While aggregator coupon web sites enhance the consumer's ability to find all coupons in one location, the consumer may still encounter numerous obstacles in the process of locating a useful and relevant coupon code.

First, a conventional coupon aggregator system does not usually closely work with or become incorporated into an e-commerce website to realize in-context automated delivery of coupon codes. As a result, a user (consumer) using a coupon aggregator system, upon visiting an e-commerce website, has to pause the user's contemporaneous e-commerce transaction while attempting to search and find coupon codes through the coupon aggregator system. Furthermore, even if locating one or more coupon codes through the coupon aggregator system, the consumer must either memorize or manually enter, or copy and paste, the code into a coupon input box during the shopping cart or checkout phase. This sequence of laboring of the user (away from the e-commerce website) not only greatly inconveniences and frustrates the user, but also in turn reduces the attraction of the coupon aggregator system to the user as a coupon code provider, thus hurting the business of coupon aggregator system built on providing coupon codes.

Next, a conventional coupon aggregator system, even if working closely with or incorporating into an e-commerce website, does not usually only provide coupon codes that have been checked to be reasonably relevant to the contemporaneous purchases (or, in other words, the current order) of a user in a shopping cart of an e-commerce website. Thus, even if the coupon aggregator system is able to provide a long list of coupon codes, the long list only aggravates the user's inconvenience and frustration when the user has to apply one coupon code after another only to realize that the applied coupon codes are not relevant to the user's contemporaneous purchases. This issue also hurts the business of coupon aggregator system built on providing coupon codes.

Further, two constant challenges of a coupon aggregator system are timely expanding its coupon code coverage to newly established e-commerce websites and timely updating and refreshing its coupon code collection of an e-commerce website. If a coupon aggregator system does not have effective means to timely expand coverage to e-commerce websites, the coupon aggregator system may very quickly lose its appeal to potential users. Since an e-commerce website can quickly roll out new coupon codes and render older coupon codes out-of-date, if a coupon aggregator system cannot timely update and refresh its coupon code collection of an e-commerce website to reflect changes or updates in coupon codes made by the e-commerce website, the coupon aggregator system may end up only providing users with out-of-date coupon codes. A conventional coupon aggregator system, on the other hand, does not have automated means to address both challenges based on user e-commerce activities or feedbacks, thus resulting in being unable to meet either challenge.

Therefore, there is a need to address some or all of the above-noted issues that conventional coupon aggregator systems are not able to effectively address.

BRIEF SUMMARY

In one aspect, the present disclosure provides a system and method of in-context automated delivery of relevance-checked benefit-conveying codes. In particular, the disclosed system and method provides means to incorporate a benefit-conveying code aggregator system into an e-commerce website on which a user is making contemporaneous online purchases, such that the aggregator system, via one or more client software modules, realize a seamless in-context of automated delivery of one or more benefit-conveying codes of the e-commerce website that are relevance-checked against the user's current pending order for the e-commerce website.

In another aspect, the disclosed system and method provides automated means to collect user feedback on one or more benefit-conveying codes of an e-commerce website and update benefit-conveying code collection of the e-commerce website stored on the backend system thereof, thereby timely updating and refreshing the benefit-conveying code collection of the e-commerce website stored in the backend system.

In yet another aspect, the disclosed system and method provides automated means to automatically (programmatically) detect an e-commerce website which has not been tracked (supported) for collecting benefit-conveying codes, and add the e-commerce website into the collection of the supported websites of the backend system thereof, such that the backend system expands its coverage to the e-commerce website for benefit-conveying code aggregation and provision.

In yet another aspect, the disclosed system and method provides means programmed and configured to perform relevance-check against candidate benefit-conveying codes of an e-commerce website such that only benefit-conveying codes checked to be possibly relevant to a user's current order are presented to the user for the user to select and apply against the e-commerce website. In one implementation, the resulting benefit-conveying codes are ranked and then presented and listed in an order of relevance so as to facilitate the user to select and apply benefit-conveying codes most relevant to the user's current order.

In yet another aspect, the disclosed system and method provides means programmed and configured to activate loading (acquiring) of benefit-conveying codes only in a context where a benefit-conveying code input field is present. This approach effectively avoids or maximally reduces unnecessary network traffic otherwise resulted from indiscrete activation of loading of benefit-conveying codes, thereby avoiding or maximally reducing unnecessary superficial disturbance of a user's online shopping experience.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements may be exaggerated relative to other elements. Embodiments incorporating teachings of the present disclosure are shown and described with respect to the figures presented herein, in which:

FIGS. 7A-F are pictorials illustrating exemplary implementations of blocks exemplified in flowcharts illustrated in FIGS. 4, 5A and 5B.

DETAILED DESCRIPTION

Figure 1:
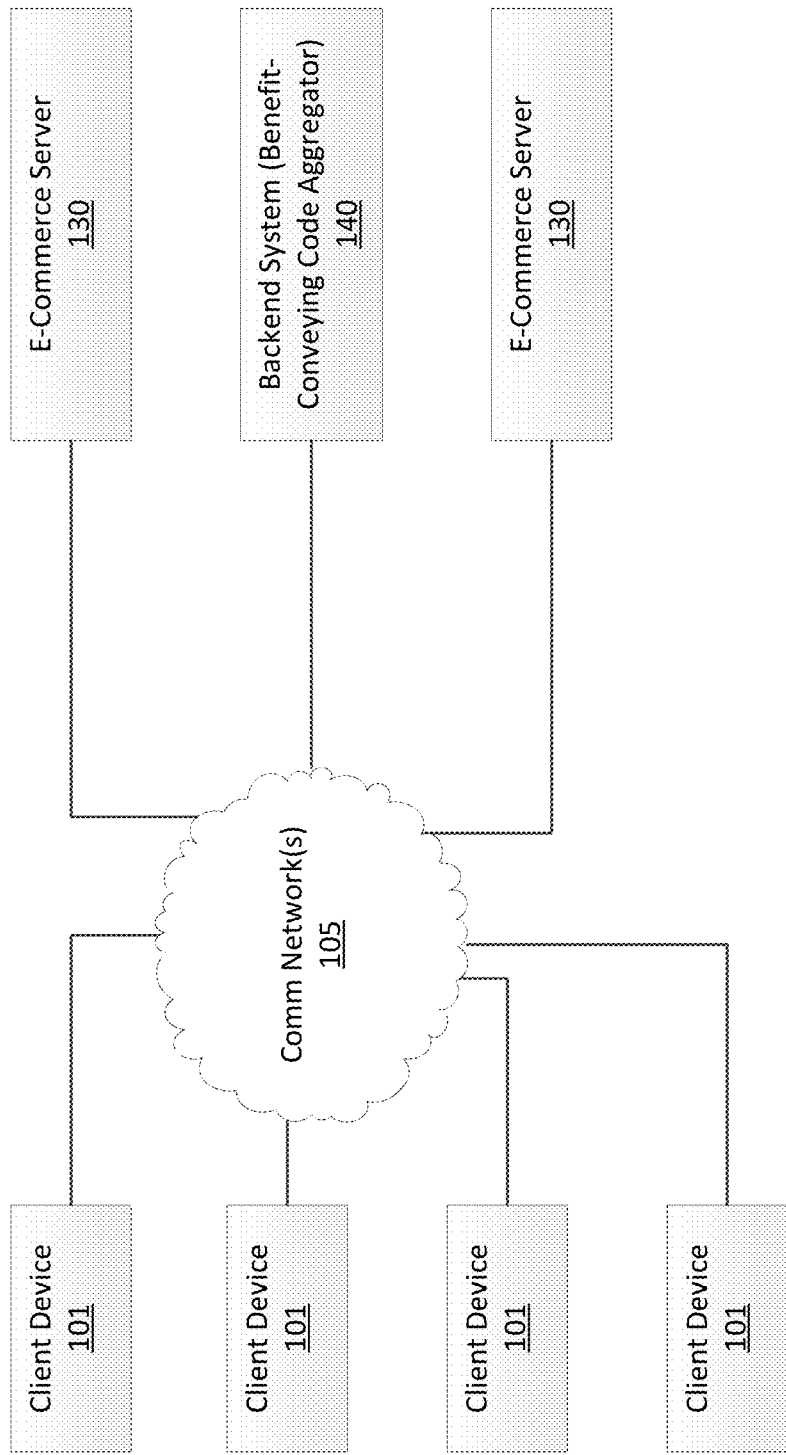
FIG. 1 is a block diagram illustrating an exemplary network environment of the disclosed system and method, according to one or more embodiments of the present disclosure.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. The following detailed description is, therefore, not to be taken in a limiting sense, and the scope of the present disclosure is defined by the appended claims and equivalents thereof. Also, descriptions of well-known functions and constructions are omitted for clarity and conciseness.

References within the specification to "one embodiment," "an embodiment," "embodiments", and "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

The terminology used herein is for the purpose of describing particular embodiments only and is not intended to be limiting of the disclosure. As used herein, the singular forms "a", "an" and "the" are intended to include the plural forms as well, "or" includes "and/or," and reference to a numerical value includes at least that value, unless the context clearly indicates otherwise. Moreover, the use of the terms first, second, etc. do not denote any order or importance, but rather the terms first, second, etc. are used to distinguish one element from another.

Functional steps illustrated herein, unless otherwise specified as, or logically required to be, performed according to a specific sequence, are presumed to be performable in any order without regard to a specific sequence.

Within the descriptions of the different views of the figures, the use of the same reference numerals and/or symbols in different drawings indicates identical, similar, or close related items, and similar or closely related elements can be provided similar names, reference numerals, and reference alpha-numerals throughout the figures. If a reference numeral is once used to refer to a plurality of like elements, unless required otherwise by context, the reference numeral may refer to any, a subset of, or all of, the like elements in the figures bearing that reference numeral. A reference alpha-numeral (such as "702A") may refer to one implementation or one portion of one element or a plurality of like elements bearing the same base reference numeral (such as "702"). The specific identifiers/names, reference numerals and reference alpha-numerals assigned to the elements are provided solely to aid in the description and are not meant to imply any limitations (structural or functional or otherwise) on the described embodiments.

In the description, relative terms such as "left," "right," "vertical," "horizontal," "upper," "lower," "top" and "bottom" as well as any derivatives thereof should be construed to refer to the logical orientation as then described or as shown in the drawing figure under discussion. These relative terms are for convenience of description and are not intended to convey any limitation with regard to a particular orientation.

In the present disclosure, the terms "module", "submodule", "application", "application module", "software", "software program", "software module", "programmatic module", "code", "application code", "programmatic code", "object", "programmatic object", "script", "routine", "service routine", "function", "service", "engine", "processor", "component", and so on, when context allows or requires, may be used interchangeably to refer to one or more sets of computer instructions adapted to perform, when executed by a processor (such as a microprocessor or a microcontroller), one or more specific functions.

As used herein, the term "benefit-conveying code" refers to any code that provides a monetary or non-monetary benefit to a user using the code during an online transaction. For example, a code that allows a user to receive free shipping is a benefit-conveying code although no price of a merchandise or service involved in the transaction is reduced. A code that allows a user to receive a discounted merchandise or service is a benefit-conveying code. A code that allows a user to "buy one get one free" is a benefit-conveying code. A code that allows a user to receive a 50% discount on a future purchase of an item from the same e-commerce company hosting the transaction is a benefit-conveying code. A code that allows a user to have a VIP access to a local gym for free for one-month is a benefit-conveying code.

For the ease of discussion, the terms "benefit-conveying code" (hereinafter simply referred to as "BC code") and "coupon code" may be used interchangeably to refer a benefit-conveying code. Similarly, as used herein, the term "coupon", when used individually without being immediately accompanied by the term "code", may be broadly construed to refer to and cover any kind or type of underlying benefit-conveying instrument (such as a coupon, a promotion, a deal, and etc.) of a benefit-conveying code. Likewise, the terms "coupon", "coupon code", "benefit-conveying code" and "BC code", may be used interchangeably to refer to any of an underlying benefit-conveying instrument of a benefit-conveying code, a benefit-conveying code, or any combination thereof.

With reference now to the figures, and beginning with FIG. 1, there is depicted a block diagram illustrating an exemplary network environment of the disclosed system and method, according to one or more embodiments of the present disclosure.

Referring to FIG. 1, the operating environment of the disclosed automated BC code delivery system and method may comprise a backend system 140 of a BC code, one or more e-commerce servers 130 each hosting an e-commerce website, and a plurality of networking-capable client devices 101. Each of backend system 140, e-commerce server 130, and a plurality of network-capable client devices 101 are communicatively coupled to each other through one or more communication networks 105, which may include Internet and/or one or more interconnected networks (such as one or more cellular networks or one or more local area networks). Although an e-commerce server 130 and backend system 140 are shown as two separate entities, these two entities may reside in the same domain as modules of a combination backend system. As used herein, an e-commerce server and the e-commerce website hosted by the e-commerce server may be used interchangeably to refer to the backend system of the e-commerce website. Thus, "e-commerce server 130" and "e-commerce website 130" may be used interchangeably.

Figure 2:
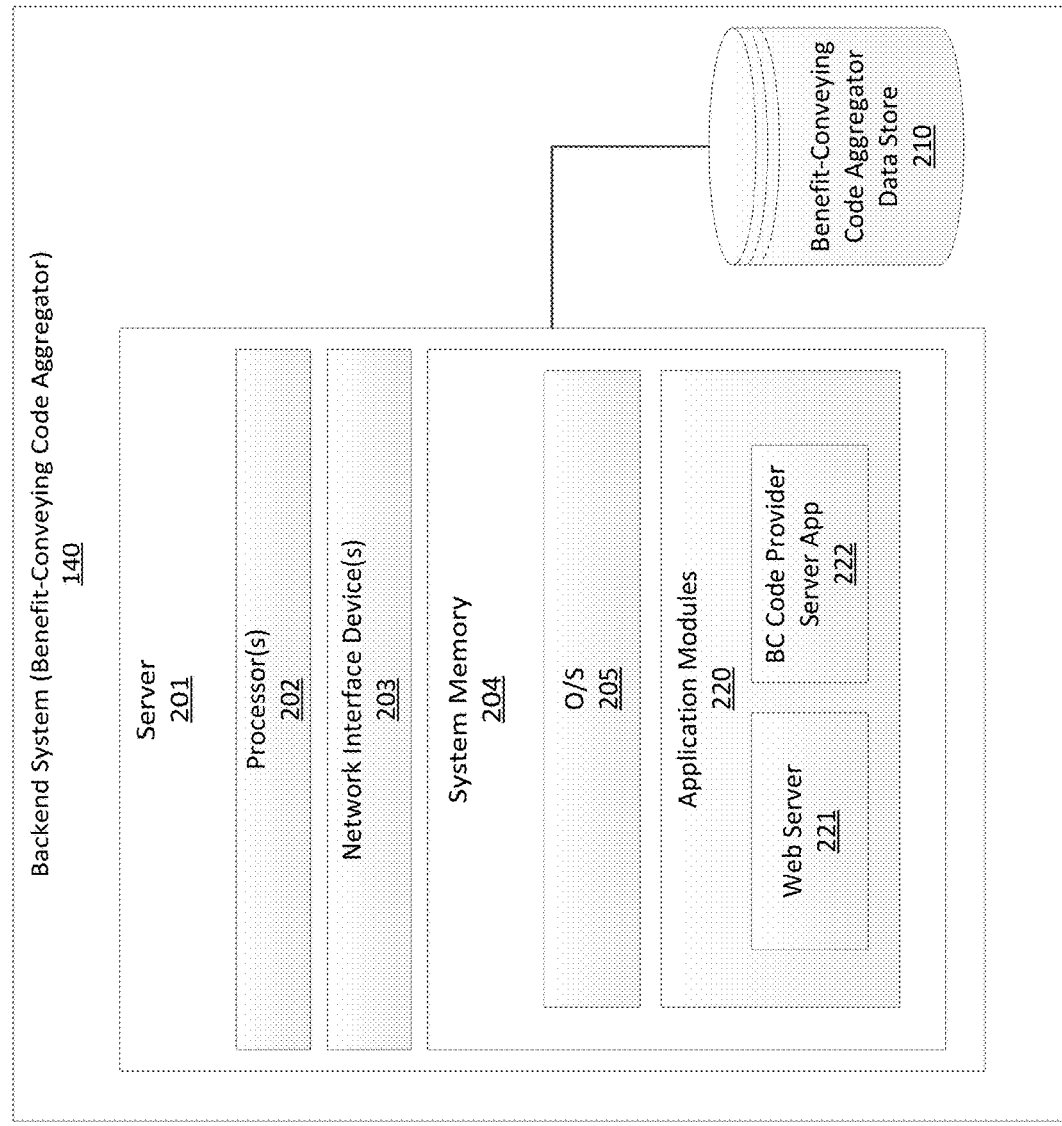
FIG. 2 is a block diagram illustrating an exemplary backend system of the disclosed system and method, according to one or more embodiments of the present disclosure.

FIG. 2 is a block diagram illustrating an exemplary backend system 140 of the disclosed system and method, according to one or more embodiments of the present disclosure. Referring to FIG. 2, backend system 140 may comprise server 201 and BC code provider data store 210. As used herein, the term "server" refers to any of various types of computing devices, such as computer clusters, server pools, general-purpose personal computers, workstations, or laptops. Server 201 comprises, inter alia, one or more processors 202 (such as one or more microprocessors), one or more network interface devices 203, and one or more system memories 204. During an operation of server 201, software modules or firmware modules, such as operating system 205 and a plurality of application modules 220, are loaded into system memories 204. These software or firmware modules, when executed by one or more processors 202, are adapted to perform various functions for which their respective programmatic (software) codes are programmed.

BC code provider data store 210 (hereinafter simply referred to as "DS 210") is communicatively coupled to server 201. DS 210 may exist or be implemented in one or more of various forms, such as one or more local or distributed relational or objective databases, one or more local or distributed file systems, one or more removable storages, one or more memory caches, one or more memory clusters, or any combination thereof. In one embodiment, DS 210 resides in server 201. In another embodiment, DS 210 resides external to server 201. DS 210 may be configured to store respective collections of BC codes of a plurality of e-commerce websites 130. DS 210 may also be configured to store data used to facilitate automated delivery of BC codes of e-commerce websites 130. By way of example and not limitation, such stored data may include information that can be used to determine whether a displayed web page of an e-commerce website 130 (or a displayed third-party shopping cart web page used to provide shopping cart functions of the e-commerce website 130) contains an applicable BC code input field, or information that can be used to locate, e.g., the total value of a current order as displayed on a current online transaction web page (such as a current shopping cart or checkout web page) of the e-commerce website.

Application modules 220 may be implemented in various forms, such as standalone executable programs, callable functions and routines, scripts that can be executed via running of one or more interpreter programs, services that may be invoked by standard or proprietary protocols, and programmatic objects containing both data and callable functions. In one embodiment, application modules 220 may include a web server module 221 and a BC code provider server application module 221 (hereinafter simply referred to as "server app 221").

Web server module 221 may be programmed and configured to receive requests (such as web requests) from a client application (such as a web browser or a web browser extension) of a client device 101, calls one or more corresponding application modules (such as server app 221) to handle the received request, and deliver a corresponding response (such as a web response) to the requesting client application.

BC code provider server application module 221 may be configured and programmed to handle requests each for or associated with BC codes of an e-commerce website 130. In one scenario, upon receiving such a request for, e.g., providing BC codes (via, e.g., web server module 221), server app 221 may communicate with DS 210 so as to, e.g., programmatically retrieve the requested BC codes based on, e.g., the domain information of the e-commerce website 130 included in the received request. In another scenario, server app 221 may receive a request for updating or refreshing BC codes of an e-commerce website 130 currently stored in DS 210—such as removing one or more specified BC codes of the e-commerce website 130—based on user feedback (on the one or more specified BC codes) received by one or more client-side software modules. Upon receiving such a BC code updating or refreshing request, server app 221 may communicate with DS 210 so as to programmatically effectuate DS 210 to realize the requested updating or refreshing (such as the aforementioned removing) on the specified on or more BC codes. For example, server app 221 may issue one or more commands to programmatically instruct DS 210 to remove the one or more specified BC codes from the collection of BC codes of the e-commerce website 130 stored in DS 210.

As used herein, a "communication" (or "contact") between a client application of a client device 101 (such as a browser application or a database of client device 101) and DS 210 of backend system 140 refers to a communication conducted between the client device 101 and DS 210 through one or more intermediate application modules, such as web server module 220 and server app 221, via one or more communication channels established between the client device 101 and server 201 of backend system 140 as illustrated in FIG. 1.

Figure 3A:
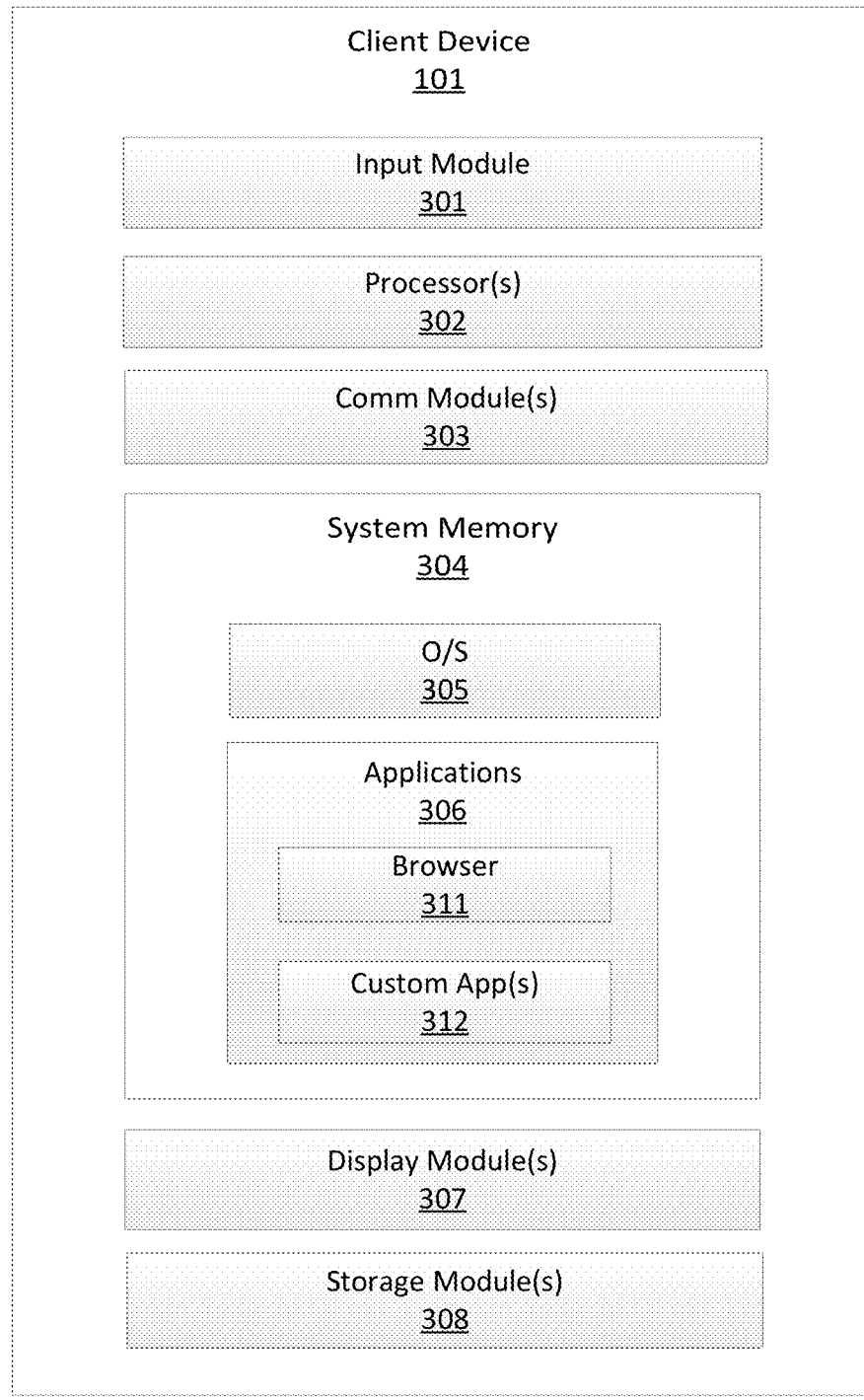
FIGS. 3A-B are block diagrams illustrating an exemplary client device of the disclosed system and method, according to one or more embodiments of the present disclosure.
Figure 3B:
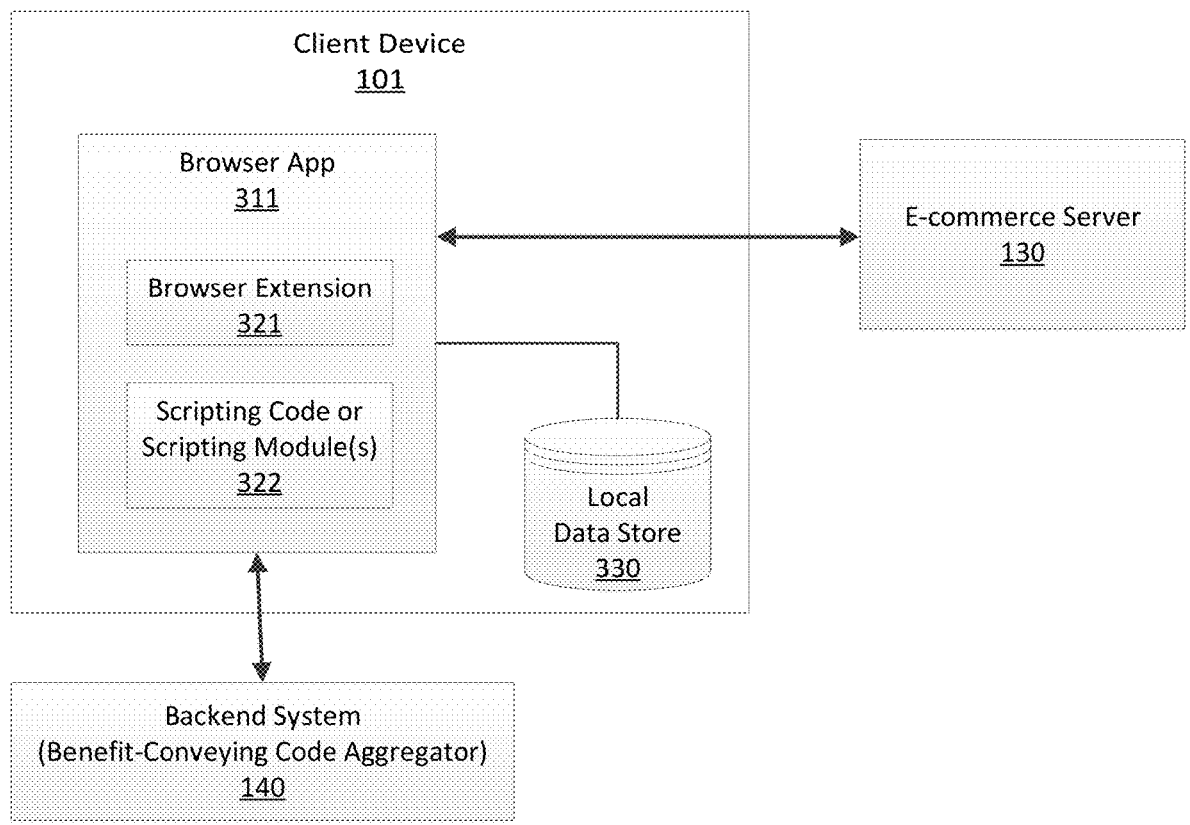

FIGS. 3A and 3B are block diagrams illustrating an exemplary client device 101, according to one or more embodiments of the present disclosure. Referring to FIG. 3A, which is a general diagram illustrating an exemplary client device 101, a client device 101 may comprise, inter alia, an input module 301, one or more processors 302, communication and interface modules 303, a system memory 304 (which may include an operating system 305 and client applications 306), one or more display modules 307, and one or more storage modules 308.

Examples of a processor 302 include a microprocessor and a microcontroller. Input module 301 receives input from a user and provides the received input to processors 302 for further processing by software programs running in processors 302. An exemplary input module 301 may include a keyboard, an input pointing means (such as a mouse, a touchpad, a touch screen, or any combination thereof), input keys, or any combination thereof.

Communication and interface modules 303 may be configured to provide wired and/or wireless networking capabilities and capabilities of interfacing with other external devices. Communication and interface modules 303 may include one or more communication devices (such as network interface device (NID), an RF unit, and antenna, or any combination thereof) and/or one or more interfacing devices (such as one or more USB connectors), as well as software or firmware modules driving or supporting aforementioned communication and/or interfacing devices.

Display module 307 may include one or more display devices, such as an LCD display screen, that is used to display user input data or output data provided by an application running in the shown client device. Display module 307 may include a touch screen which also allows user to input data. In that case, Display module 307 may also serve as an input device (particularly an input pointing means) as part of input module 301. Storage module 308 may include various internal and external storage media, such as RAM, ROM, hard disk, smart card, flash memory, and any external storage accessible via, e.g., the communication module or an interface module (not shown) of the client device, such as a USB interface.

One or more client applications 306 may be loaded into the system memory during an operation of a client device 101. Client applications 306 may include one or more browser applications 311 which are specifically programmed to display HTML-based (or other XML-based) web pages. Examples of a browser application 311 include Google's Chrome, Microsoft's Internet Explorer, Apple's Safari, and Mozilla's Firefox. Client applications 306 may include one or more non-browser custom client applications 312 to conduct online e-commerce transactions with e-commerce websites 130. Such a non-browser custom client application 312 is often referred to as an "app" when the hosting client device 101 is a smart phone or a tablet. A non-browser custom client application 312 may exist in various forms. For example, a non-browser custom client application 312 may be a standalone application running in a PC, a notebook computer, a tablet, a smart phone, or a PDA. A non-browser custom client application 312 may also be a software module running inside a specific application context, such as a so-called "Facebook app" running inside a Facebook context (a social networking context).

FIG. 3B is a simplified diagram illustrating exemplary application modules of a client device 101 as particularly applicable to the disclosed system and method, as well as inter-connections among a client device 101, an e-commerce server 130 and backend system 140 of a BC code aggregator system, according to one or more embodiments of the present disclosure. Specifically, a browser application 311 may embed a third-party browser extension application module 321, which is commonly referred to as a "plug-in" or an "add-on" of a browser application 311. As well-known, a "plug-in" or an "add-on" may exist or be implemented in different forms, including one or more Java Applets, one or more ActiveX Controls, or one or more callable scripting modules implemented using one or more scripting languages (such as Java Script) and executed by one or more corresponding interpreter programs.

A browser application 311 may further call or invoke one or more scripting modules 322 embedded in or injected into a web page loaded and rendered by the browser application 311. A scripting module 322, as well-known, may be implemented using a particular scripting language, such as JavaScript. A browser extension 321 may inject one or more scripting modules 322 into a loaded web page such that the browser extension 321 and the scripting modules 322 can work in concert to achieve specific functions used by, or otherwise applicable to or involved in, the disclosed system and method. As illustrated, browser extension 321 and/or a scripting module 322 may communicate and interact with both an e-commerce server 130 and backend system 140 so as to achieve in-context automated delivery of relevance-checked BC codes of the e-commerce website 130. As used herein, backend system 140 of a BC code provider system, if allowed by the context, may also be used to refer to an operating entity of the BC code provider system.

A client device 101 may optionally further include a local data store 330, which may reside in one or more storage modules 308. DS 330 may exist or be implemented in one or more of various forms, such as one or more relational or objective databases, one or more flat files (stored in one or more internal hard disks or removable external storage devices), one or more memory caches, one or more memory clusters, or any combination thereof. DS 330 may be configured to store respective collections of BC codes of a plurality of e-commerce websites 130. DS 330 may also be configured to store data used to facilitate automated delivery of BC codes of e-commerce websites 130. DS 330 may include a local server application (such as a local database server) programmed and configured to retrieve, store and update data stored in DS 330.

In one implementation, DS 330 occasionally, regularly or continually synchronizes (via, e.g., the aforementioned local database server) with DS 210 of backend system 140 (through, e.g., a Web Service or API calls made by the local database server and directed to backend system 140), so as to store and maintain a replica of up-to-date respective collections of BC codes of either a complete set or a sub set of e-commerce websites 130 supported by backend system 140, that are stored in DS 210. The synchronization may be initiated by browser extension 321 (or scripting module 322), and/or may be carried out in the background (e.g., as a background process). In one implementation, local DS 330 (including the local database server) may be installed with browser extension 321.

For the ease of illustration, the present disclosure primarily discuss the case of a browser application 311 of a client device 101 being used to conduct online transactions with an e-commerce website 130, and various implementations of browser 321 and/or scripting module(s) 322 used by the client device 101 to achieve client-side functionalities of the disclosed system and method. As a skilled artisan appreciates, in the case of a non-browser custom client application 312 being used to conduct online transactions with an e-commerce website 130, a corresponding extension (or, in other words, "plug-in" or "add-on") module of client application 312 (corresponding to browser extension 321) and/or corresponding one or more scripting modules (corresponding to scripting module 322) may likewise be configured and programmed to achieve same or similar client-side functionalities of the disclosed system and method, without departing from the spirit and scope of the present disclosure.

Figure 4:
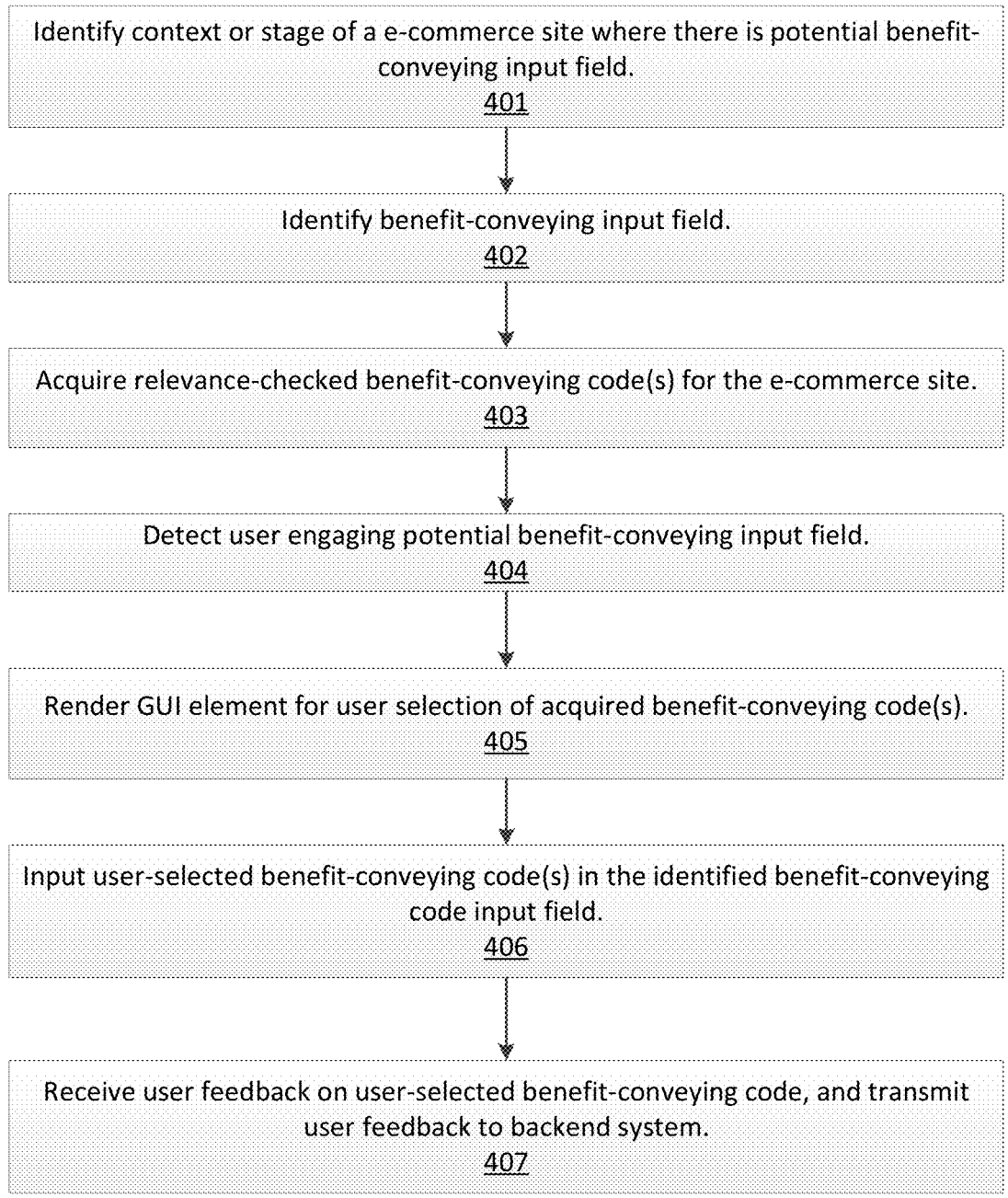
FIG. 4 is a flowchart illustrating an exemplary process of in-context automated delivery of relevance-checked benefit-convey codes of an e-commerce website, according to one or more embodiments of the present disclosure.

FIG. 4 is flowchart illustrating an exemplary process of in-context automated delivery of relevance-checked BC codes of an e-commerce website 130, according to one or more embodiments of the present disclosure. As used herein, the terms "block" and "step" may be used interchangeably to refer to a set of programmatic (software) code or instructions adapted to perform one or more specific functions (when executed by one or more processors), or the one or more performed specific functions, or any combination thereof.

Referring to FIG. 4, at block 401, browser extension 321 programmatically identifies a potential benefit-conveying context (hereinafter simply referred to as "BC context") of an e-commerce site 130 where there is likely a benefit-conveying code input field (hereinafter simply referred to as "BC code input field") included in the context. Examples of such a BC context include a web page implementing a shopping cart of the e-commerce site 130 or a web page which is used for checkout of the e-commerce site 130.

As a skilled artisan appreciates, block 401 may be implemented in various ways. In one implementation, browser extension 321 may use a set of commonly used keywords or phrases that often appear within the URL of a current web page to determine whether the current web page is a BC context. In the English language, these keywords or phrases may include "cart", "checkout", "shopping bag", "order", and many others which may exist. As used herein, "a current web page" refers to a web page which a user is contemporaneously accessing through web browser 311. In other words, "a current web page" refers to a web page contemporaneously displayed by web browser 311 on client device 101 before a user.

Additionally or alternately, browser extension 321 may communicate with DS 210 (via, e.g., server application 222 of backend system 140) or local DS 330 (via, e.g., a local database server of DS 330) in order to determine whether the URL of a current web page indicates that the current web page is a BC context of the e-commerce website 130. In one implementation, browser extension 321 may receive a result (via, e.g., either sever application 222 or the local database server through a Web Service or API call) as a Boolean expression (true or false) indicating whether the current web page is a potential BC context. Browser extension 321 may use any of the above-described schemes or any combination thereof, to identify a benefit-conveying context.

In implementing block 401, browser extension 321 may track the history of one or more domain names of the last few web pages which the user has latest visited. This is because an e-commerce website 130 may use a third party website to implement the e-commerce website 130's shopping carts, thus resulting in a BC context being a web page of the third party website. FIG. 7C is a pictorial illustrating such an example applicable to hockygiant.com, which is an e-commerce site 130. A user (consumer) proceeds to the hockeygiant.com domain to do his/her shopping. Once the user finishes selecting his/her shopping items, clicking the shopping cart or checkout button brings the user to a third-party checkout page (shopping cart page) on Yahoo!'s server. As illustrated by URL 711 of the shown shopping cart page (which is a BC context), the user shopping at hockygiant.com ends up visiting yahoo.net as a BC context for the hockeygiant.com e-commerce site. By tracking the history of one or more domain names, browser extension 321 is able to detect that the user comes from an e-commerce site 130 (which, in the hockygiant.com case, is hockygiant.com)—which may be different from the domain of a current web page against which block 401 is performed—and inform local DS 330 or DS 210 accordingly (e.g., that the BC context inquiry is for e-commerce site 130 and not for the third party domain name), so as to identify a potential BC context (which, in the hockygiant.com case, is a yahoo.net web page) for the e-commerce site 130.

As apparent from the above-description of block 401, block 401 is designed to programmatically identify a BC context so as to trigger an in-context automated delivery of one or more BC codes. In another embodiment, block 401, however, may not be needed, and thus is optional, if, e.g., there is a mechanism available in browser 311 that lets the user to pro-actively trigger an in-context automated delivery of BC codes. For example, a bookmarklet may be adaptively provided on the browser, such that the user can click the bookmarklet as he or she knowingly enters a BC context. The clicking of the bookmarklet then triggers underlying JavaScript code thereof, which may perform specific blocks (steps) and functions equivalent or similar to those performed by browser extension 321 which lead to an automated delivery of BC codes before the user. In other words, the underlying JavaScript code of the bookmarklet is, or comprises, one or more scripting modules 322. As such, the underlying JavaScript code of the bookmarklet may hereinafter also be referred to as JavaScript code 322.

Thus, in the present disclosure, a block or function described as performed by browser extension 321, so long as allowed by the context, should be construed as one which may also be performed by one or more equivalent scripting modules 322, such as JavaScript code 322 (or scripting code implemented using another scripting language) triggered by, e.g., the clicking of a corresponding bookmarklet.

If a potential BC context is identified (either via block 401 or by a proactive user), at block 402, browser extension 321 identifies one or more potential BC code input fields. As a skilled artisan appreciates, block 402 may be implemented in various ways. In one implementation, browser extension 321 may inspect the HTML of the user's current web page to look for a potential BC code input field, such as a coupon code input box or a promo code input box. Browser extension 321 may use a set of commonly used keywords or phrases such as "coupon", "discount", "voucher", "promo", as well as many others which may exist, to look within the attributes of the HTML <input> elements. The browser extension may also look for these keywords in text that may be located near an <input> tag within the HTML document. As well known, this can be accomplished by traversing the Document Object Model (DOM) of the current web page.

Additionally or alternately, browser extension 321 may communicate with DS 210 of backend system 140 or local DS 330 to confirm the existence of, and determine the location of, a BC code input field. For example, an e-commerce checkout web page may contain a very generic coupon input box simply named "just another input box". Using the basic scenario of keywords, browser extension 321 may not detect this as a BC code input field. However, if helpful information, such as a BC code input field's HTML attribute name or ID, is stored in a either DS 210 or local DS 330 in conjunction with website URL (of, e.g., the current web page) for the e-commerce website 130 (which, as noted, can be a URL of a third party domain) and/or domain name information of the e-commerce website 130, browser extension 321 may look at this information to determine if a BC code input field is located on the current web page for the e-commerce website 130 (which, as noted, can be a web page whose URL is of a third party domain).

In one implementation, JavaScript code 322 may be triggered (e.g., by the user's clicking of the bookmarklet described in connection with block 401) to perform what may otherwise be performed, as described above, by browser extension 321, so as to identify a potential BC code input field.

Figure 7A:
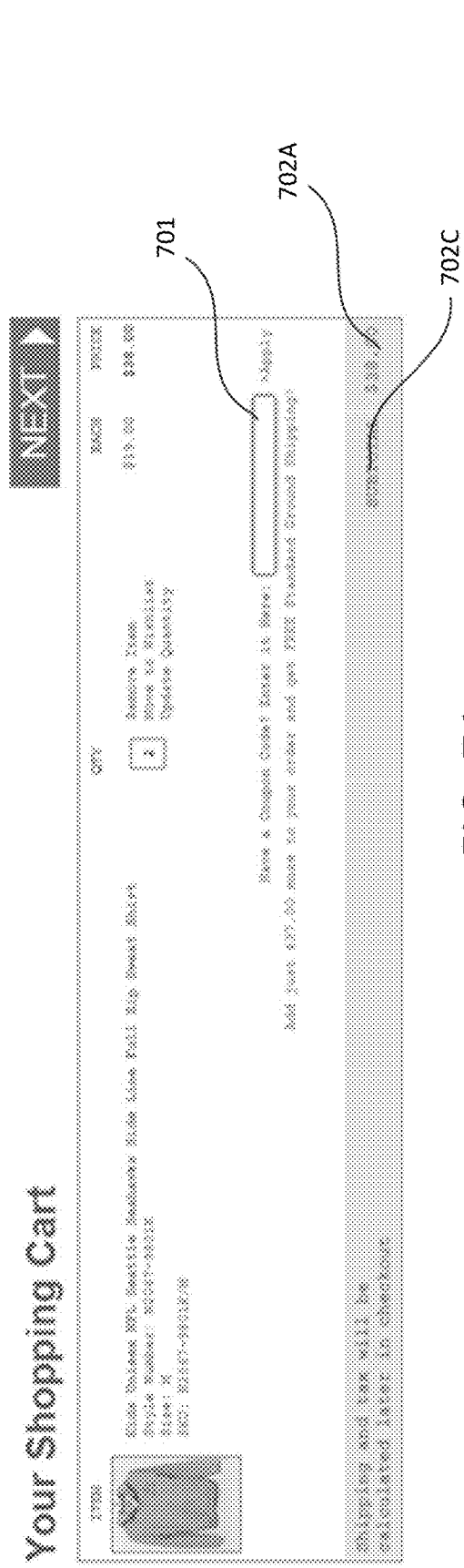

FIG. 7A is a pictorial illustrating an exemplary BC code input field 701, as, e.g., identified by browser extension 321. In one implementation, the identified BC code input field 701 is highlighted by browser extension 321, in order to bring attention to the user that a BC code input field has been identified and an automated delivery of BC codes of the e-commerce website 130 may be forthcoming. The highlighting may be implemented in various known manners. As illustrated, in achieving the highlighting, the border of input field 701 can be made thicker by browser extension 321. Additionally or alternately, the color of the border of input field 701 may be rendered a special color (like red) by browser extension 321. Additionally or alternately, browser extension 321 may render a special icon (such as an icon representing a logo of entity of the BC aggregator system 140) inside the box of input field 701.

At block 403, browser extension 321 performs necessary steps so as to result in either browser extension 321 or browser 311 acquiring one or more relevance-checked BC codes for the e-commerce website 130. Specifically, block 403 has two aspects, namely, the "acquisition" aspect of acquiring BC codes of an e-commerce website 130, and the "relevance-checking" aspect of checking relevance of BC codes of an e-commerce website 130.

Figure 5A:
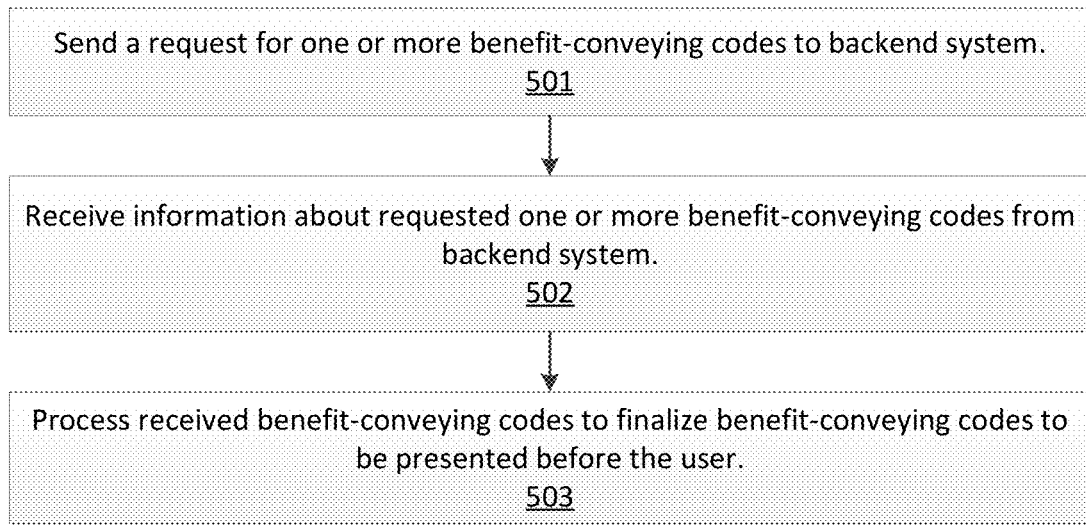
FIGS. 5A-B are flowcharts illustrating an exemplary implementation of block 403—namely, acquiring relevance-checked benefit-conveying codes of an e-commerce website—according to one or more embodiments of the present disclosure.

With respect to the acquisition aspect of block 403, FIG. 5A is a flowchart illustrating exemplary blocks implementing the aspect. At block 501, browser extension 321 sends a request for one or more BC codes of the e-commerce website 130 (for which a BC context and/or a BC code input field has/have been identified) to backend system 140.

As a skilled artisan appreciates, there are various ways to implement this block. In one implementation, browser extension 321 may construct a request in accordance with one or more standard or proprietary secure or non-secure protocols and direct the constructed request to an address corresponding to a sever of backend system 140 (such as server 201 of backend system 140). Code Snippet 1 illustrated in FIG. 7F shows an exemplary implementation of such a request. Specifically, the example request is a web request (HTTP request) directed to the URL listed in code snippet 1. The URL includes a specified protocol (HTTP), a base address directed to backend system 140 ("couponwebserverexample.com"), as well as one or more parameters including information about the e-commerce website 130 ("site=macys.com) and optional data indicating or defining the nature of the request ("loadXML?"). The data indicating or defining the nature of request may be optional because the base address or the URL as a whole may have already indicated or defined the nature of the request, given the base address or the URL may be specifically configured by backend system 140 to handle such a request for BC codes of a specified e-commerce website 130.

In one implementation, browser extension 321 may inject a set of IFrame-based HTML code into the identified BC context (such as a current e-commerce checkout web page) as a way to send a request for one or more BC codes of the e-commerce website 130. Code Snippet 2 illustrated in FIG. 7F shows an example of a simplified version the IFrame-based HTML code implementing the constructing and sending of such a request. Specifically, similar to the example request implementation shown in code snippet 1, the IFrame-based HTML code also includes information about the destination URL directed to backend system 140 ("couponwebserverexample.com"), information about a used secure protocol (HTTPS), and one or more parameters including information about the e-commerce website 130 ("site=macys.com) as well as data indicating or defining the nature of request ("loadGUI?"). After the IFrame-based HTML code is injected into the BC context, a request (as defined or specified by the IFrame-based HTML code) is automatically sent to backend system 140. This IFrame-based implementation will be further discussed below in connection with one or more other blocks.

A skilled artisan appreciates that the request can be constructed in myriad other ways so long as the request is directed to backend system 140 and the request includes information that allows backend system 140 to understand the nature of the request (which, in this case, is request for BC codes of a specified e-commerce site 130) and receive one or more parameters needed for backend system 140 to correctly respond to the request (parameters which, in this case, at least include the domain name information of the specified e-commerce site 130).

At block 502, if the e-commerce website 130 is supported by backend system 140 and backend system 140 stores a collection of one or more BC codes of the e-commerce website 130, either browser extension 321 or browser 311 receives from backend system 140 information about the requested one or more BC codes of the e-commerce website 130. Otherwise, either browser extension 321 or browser 311 may receive an error response indicating, e.g., either the e-commerce website 130 is not supported by backend system 140 or no known valid BC code for the e-commerce website 130 is available in backend system 140. In one implementation, the received information about the requested one or more BC codes of the e-commerce website 130 may, for each BC code, include, inter alia, the text of the BC code, a description of one or more terms for the use of the BC code as benefit-conveying instrument. The term description of the BC code may include one or more of a required minimum total spending of an order, a description of the specific products applicable to the BC code, an expiration date of the BC code, the date which the BC code was issued, and any combination thereof. The received information about the requested one or more BC codes may contain information about the relevance ranking of each included BC code either through express data indicating the ranking or through the order of the BC codes arranged (listed) in the received data package containing the information about the requested BC codes.

The information about the requested one or more BC codes of the e-commerce website 130 (or the error response) may be received in various forms. In one implementation, browser extension 321 may receive the one or more return BC codes in a standardized delivery format (such as XML, JSON, CSV, and etc.) or a known proprietary delivery format. In the above-noted IFrame-based HTML injection implementation, as a skilled artisan appreciates, browser 311 receives the one or more return BC codes in the form of a set of HMTL code which, when rendered by browser 311, results in displaying information about the return one or more BC codes in a GUI created by or originated at backend system 140.

At block 503, browser extension 321 further processes received BC codes so as to finalize BC codes to be presented before the user. This block is applicable to implementations of block 502 where browser extension 321 receives the return BC codes for the e-commerce website 130. Thus, this block is not applicable to the above-noted IFrame-based HTML injection implementation, given that with that implementation, as noted above, it is browser 311, not browser extension 321, that receives the one or more return BC codes (in the form of, e.g., HTML code). Also, this block 503 may be optional if browser extension 321 has no need to further process the one or more return BC codes, due to the consideration that, e.g., backend system 140 has already performed all the necessary processing on an initial set of BC codes retrieved from DS 210 so as to finalize the list of one or more BC codes to be presented to the user. In one implementation, the processing performed in block 503 may include applying a set of collected (detected) relevance factor data to the received one or more BC codes so as to remove BC code(s) which are clearly irrelevant to the current order (as reflected in, e.g., the current shopping cart web page or checkout web page) in finalizing the BC codes to be presented before the user. The process may further include ranking the finalized BC codes in an order of relevance based on a set of collected relevance factor data.

Figure 5B:
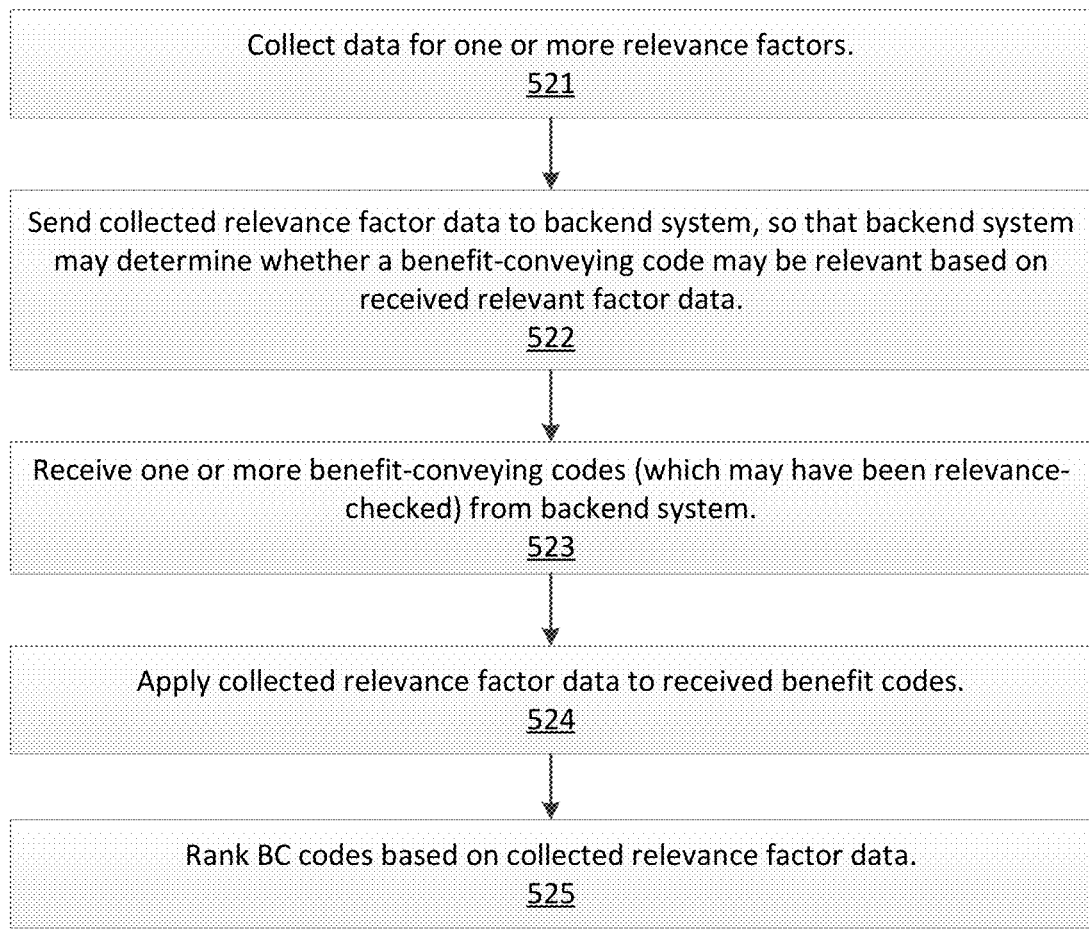

Turning to the relevance-checking aspect of block 403, FIG. 5B is a flowchart illustrating an exemplary set of blocks implementing the relevance-checking aspect, according to one or more embodiments of the present disclosure.

At block 501, browser extension 321 collects data for one or more factors (hereinafter simply referred to as "relevance factors) which MAY be used to determine whether one or more BC codes may be relevant to the current order of the user (as reflected in, e.g., the current shopping cart web page or checkout web page).

In particular, relevance factors are only applicable to a known order (shopping cart) of a user. As noted above, conventional BC code aggregator systems or vendors, which do not work closely with or become incorporated into a user's online transaction with an e-commerce website 130, have no knowledge of an on-going contemporaneous order (shopping cart) of the user with the e-commerce website 130. Thus, those conventional BC code aggregator systems or vendors each may only "blindly" provide a list of BC codes of the e-commerce website 130 and put all the burden on the user to apply or otherwise test the provided BC codes. By contrast, the disclosed system and method may check or estimate the relevance of each available BC Code before presenting the BC code to the user, thus greatly facilitating the user to end up obtaining and using a BC code relevant the current order of the user.

With respect to block 521, applicable relevance factors may include, inter alia, the total value of a current pending order (current shopping cart) and the shopping contents of a current pending order (current shopping cart).

With regard to the total value relevance factor, an e-commerce website often offers a variety of site-wide BC codes (such as coupon codes) which are not specific to a certain product but are relevant to the total value of an order. In particular, a site-wide coupon may only activate or be applicable after a specific minimum total spend has been achieved. Hence, the total value of a current order is usually a relevance factor.

To collect data for the total value relevance factor—e.g., the total value of a current order—browser extension 321, in one implementation may be programmed and configured to do so by traversing the DOM within the HTML code of an identified BC context (such as the current checkout or shopping cart web page) and searching for the total value of the current order. In one implementation, browser extension 321 may search for one or more keywords such as "order total", "subtotal", "total", "cost", and etc., as a way to locate a possible total value of a current order. If such a keyword 702C (as illustrated in FIG. 7A) is located in the HTML code, a character string immediately next to the located keyword (e.g., separated only by one or more spaces or tabs) and made of a numerical value and a currency symbol preceded immediately before the numerical value is a likely candidate for the total value of the current order. Browser extension 321 may collect the numerical value included in the character string as the total value 702A of the current order (which is data for the total value relevance factor), as illustrated in FIG. 7A.

Figure 7B:
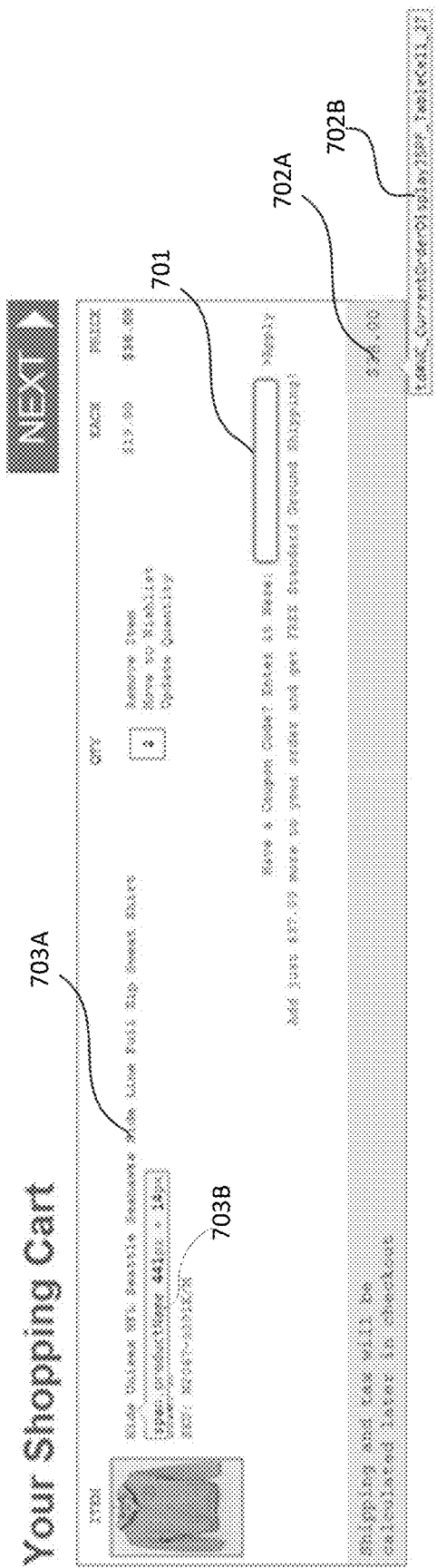
Figure 7C:
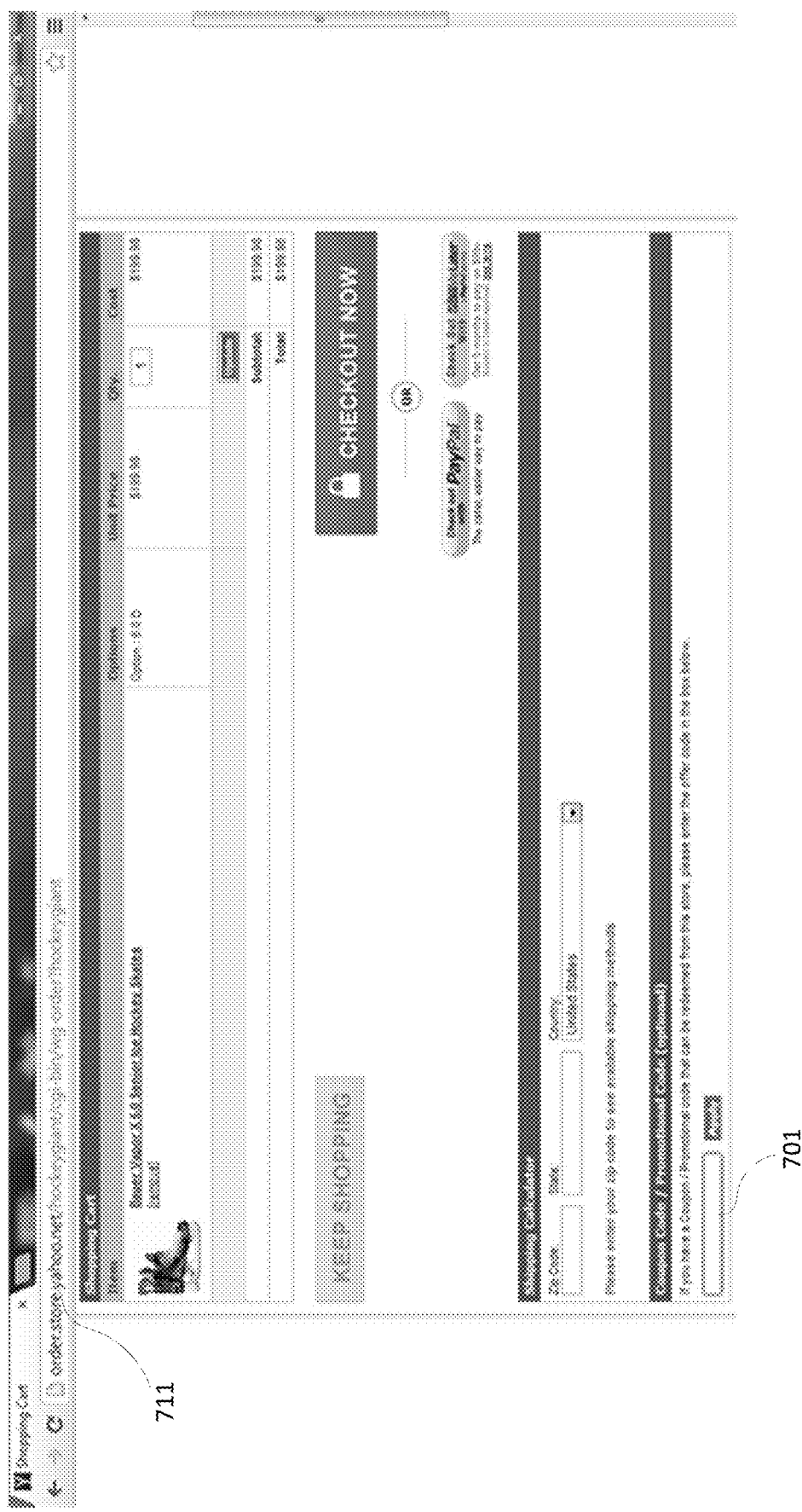

In one implementation, DS 210 or DS 330 may store, for each supported e-commerce website 130, a DOM location of an identified BC context for the supported e-commerce website 130 (which, as illustrated in FIG. 7C, can be a shopping cart or checkout page of a third-party domain) that can be used to extract or otherwise obtain the total value of the current order. Thus, browser extension 321 may contact DS 210 or DS 330 to retrieve such a DOM location for the e-commerce site 130, and use the retrieved DOM location to extract (or otherwise obtain) the total value of the current order. This implementation (which may be additional or alternative to the above-noted keyword-searching implementation) may be particularly applicable to an identified BC context which does not contain any keyword indicating the total value of the current order. FIG. 7B illustrates an example in which no total-value-indicative-keyword is present in the HMTL code. Specifically, browser extension 321 contacts either DS 210 or DS 330, which returns a DOM location of the identified BC context—namely, the DOM location 702B as illustrated—for extracting the total value 702A of the current order. Browser extension 321 then uses the DOM location 702B to obtain the total value 702A of the current order, thus achieving the collecting of data for the total value relevance factor.

With regard to the shopping contents relevance factor, an e-commerce website 130 may also often offers BC codes that are not site-wide and may be valid only for products of, e.g., specific brands and/or categories. For example, an e-commerce website 130 may offer a coupon code for purchasing a desk of a particular brand. Hence, if such a coupon code is presented before the user when the current order of the user (current shopping cart of the user) does not include any desk, such a coupon code would have no relevance to the current order of the user. This scenario may occur when a BC aggregator system or vendor does not factor in the relevance of a coupon to a current user's shopping cart contents.

To collect data for the shopping contents relevance factor—e.g., descriptions of products included in the current order (current shopping cart)—browser extension 321, in one implementation, may traverse the DOM within the HTML code of the identified BC context to search for one or more specific DOM locations where respective descriptions of one or more shopping cart items (products) can be located and extracted. FIG. 7B also illustrates an exemplary DOM location 703B where the description of a shopping cart item 703A can be extracted (or otherwise obtained). Similar to the database-based implementation noted above in connection with collecting data for the total value relevance factor, browser extension 321 may obtain information about these DOM locations by contacting e.g., DS 210 or DS 330 (which may be configured to store these DOM locations of a BC context for an e-commerce website 130). Upon locating these DOM locations, browser extension 321 may extract or otherwise obtain respective descriptions of one or more shopping cart items (products), thus achieving collecting the data for the shopping contents relevance factor.

A skilled artisan appreciates that there may be other relevance factors, and implementations same as or similar to those described above may be used to collect data for those other relevance factors without departing from the spirit and scope of the present disclosure.

At block 522, after collecting data for one or more various relevance factors—such as data for the total value relevance factor and/or data for the shopping contents relevance factor—browser extension 321, sends the collected relevance factor data to backend system 140, so that backend system 140 may determine whether a retrieved BC code of the e-commerce site 130 (from, e.g., DS 210) may be relevant to the current order of the user based on the received relevance factor data.

In one implementation, block 522 may be part of, or merged with block 501. In particular, the collected relevance factor data may be packaged. The packaged relevance factor data, along with data (or a flag) indicating the nature of the packaged relevance factor data (which, e.g., is for determining relevance of a given BC code to the current order of the user), may then be added to or otherwise included in the BC code request (exemplified in code snippets 1 and 2). The formed BC code request (containing the collected relevance factor data) may then be sent to backend system 140 so as to achieve both blocks 522 and 501. In one implementation, block 522 may be performed separately from block 501. Hence, the collected relevance factor data may be sent to backend system 140 using a transmission separate from the one used in block 501.

At block 523, browser extension 321 may receive one or more relevance-checked BC codes from backend system 140. In one implementation, block 523 may be part of, merged with, or just another reference numeral for, block 502. Thus, implementations that may be used for block 502, as described above in connection with block 502, may also be used for block 523.

Optionally, at block 524, browser extension 321 may apply collected relevance factor data to some or all of the one or more BC codes received at block 523 or block 502 so as to determine whether any of the received BC codes is possibly relevant to the current order. This block 524 may not be needed if it is known in advance that backend system 140 has already adequately applied the same collected relevance factor data to some or all of the one or more BC codes received from backend system 140.

On the other hand, this block 524 may not be optional if it is known that backend system 140 does not perform any relevance-checking against retrieved BC codes of the e-commerce site 130. In that case, block 523 is not applicable (since the one or more BC codes returned from backend system 140 are not relevance-checked). And block 522 may not be needed, since there is no point to send collected relevance factor data to backend system 140 when it is known that backend system 140 does not perform any relevance-checking against retrieved BC codes. In that case, block 521, on the other hand, may be performed at any time before block 524 is performed. Hence, in that case, block 521 may be performed after block 502—namely, receiving requested BC codes—is performed.

In one implementation of block 524, for a received BC code, browser extension 521 may first determine the nature of the BC code based on the received term description for the BC code, and then applies collected relevance factor data that are applicable to the nature of the BC code to the BC code to determine whether the BC code may be relevant to the current order of the user. For example, if the BC code, according to its received term description, is a site-wide coupon code which may only activate after a specific minimum total spending has been achieved, browser extension 321 may use the collected data for the total value relevance factor—e.g., the collected total value of the current order—to determine the relevance of the BC code (or lack thereof) by determining whether the collected total value of the current order is above the minimum total spending specified in the BC code. Similarly, if, according to its received term description, the BC code is only applicable to products of one or more specific brands or categories, browser extension 321 may use the collected data for the shopping contents relevance factor—e.g., the collected descriptions of the shopping cart items—to determine relevance of the BC code by determining whether any shopping item, based on its collected description, is included or covered by the aforementioned products of one or more specific brands or categories as applicable to the BC code. Likewise, if the received term description includes an expiration date of the BC code and according to the expiration date, the BC code is expired at a certain date, browser extension 321 may use the current date to determine whether the BC code has been expired, and thus the relevance of the BC code.

Optionally, at block 525, browser extension 321 may rank the received one or more BC codes in an order of relevance (e.g., an order of from the most relevant to the least relevant), so that when browser extension 321 may present the received one or more BC codes in accordance with the determined rankings of the finalized BC codes. This block may not be needed if it is known that backend system 140 has already ranked the return BC codes and indicated the rankings through the information about the BC code as received in block 502.

In one implementation of block 525, the rankings of received BC codes may be determined using the rankings of calculated potential savings (in dollar amount) that can be achieved when respective BC codes are each applied to the current order. So, for example, if, according to calculations, BC code A achieves more potential savings when applied than BC code B when applied, BC code A may be ranked ahead of BC code B. In one implementation, of two BC codes somehow ranked the same or similar, the BC code issued later, according to the information about both BC codes, is ranked ahead of the other BC code issued earlier. A skilled artisan appreciated that there can be implementations other than the two described above that can be used to implement block 525 without departing the scope and spirit of the present disclosure.

To summarize with respect to block 403, block 403 may be implemented with exemplary blocks illustrated in flowcharts of FIGS. 5A and 5B, so as to achieve the acquisition aspect and the relevance-checking aspect thereof. Additionally, as a skilled artisan appreciates, block 403 does not have to be performed after block 401 or block 402. Specifically, block 403 may be performed even before any of block 401 or block 402 is performed. For example, block 403 may even be initiated, triggered or performed the moment browser extension 321 detects that the user has just accessed a web page of an e-commerce site 130 regardless of whether the accessed web page is a BC context.

Such an approach of initiating, triggering or performing block 403 without any regard to whether a current web page may be a BC context, however, is distinct from the above-described approach of initiating, triggering, or performing block 403 only after a current web page is identified as a BC context. This is because, if BC codes can only be acquired from DS 210 of backend system 140, the latter approach has the advantage of only incurring network data traffic (associated with acquiring BC codes) when necessary and thus avoiding or maximally reducing unnecessary network data traffic. This advantage in turn translates into better online shopping experience for the user due to reduction in number of "screen freezes" resulting from network data traffic otherwise generated (with the former approach) in connection with acquiring BC codes.

Returning to FIG. 4, at block 404, browser extension 321 detects a user engaging an identified BC code input field. As used herein, the term "engaging" shall be broadly construed as encompassing any action or actions of the user that may suggest that the user is interested in getting involved with an identified BC code input field. For example, if the user hovers a mouse pointer over the identified BC code input field, the user's "hovering" action, as detected by the client application, shall be interpreted as engaging a potential BC code input field.

As a skilled artisan appreciates, block 404 is used to inform browser extension 321 as to at what time block 405 (namely, displaying acquired BC codes) may be carried out. Browser extension 321 may, however, decide to carry out block 405 without detecting that a user is engaging a potential (an identified) BC code input field. For example, browser extension 321 may elect to display acquired BC codes at the earliest opportunity regardless of whether the user is engaging a potential BC code input field or not. Hence, block 404 can be skipped altogether by browser extension 321. Also, block 404 may be performed before block 403 is performed, since browser extension 321 may decide to load (acquire) BC codes after browser extension 321 detects a user engaging an identified BC code input field.

In one implementation, browser extension 321 detects (through, e.g., browser 311) a user engaging a potential BC code input field 701 (of, e.g., FIGS. 7A-C) such as a coupon code input box, when the browser extension detects that the user clicks the BC code input box or hovers the mouse pointer there-over. In one implementation, this detection can be achieved by browser extension 321 attaching a command (such as a programmatic listener) to the identified BC code input field 701 (such as the coupon code input box 701), such that browser extension 321 is informed of an "engaging" event when the user engages the BC code input field.

Figure 7D:
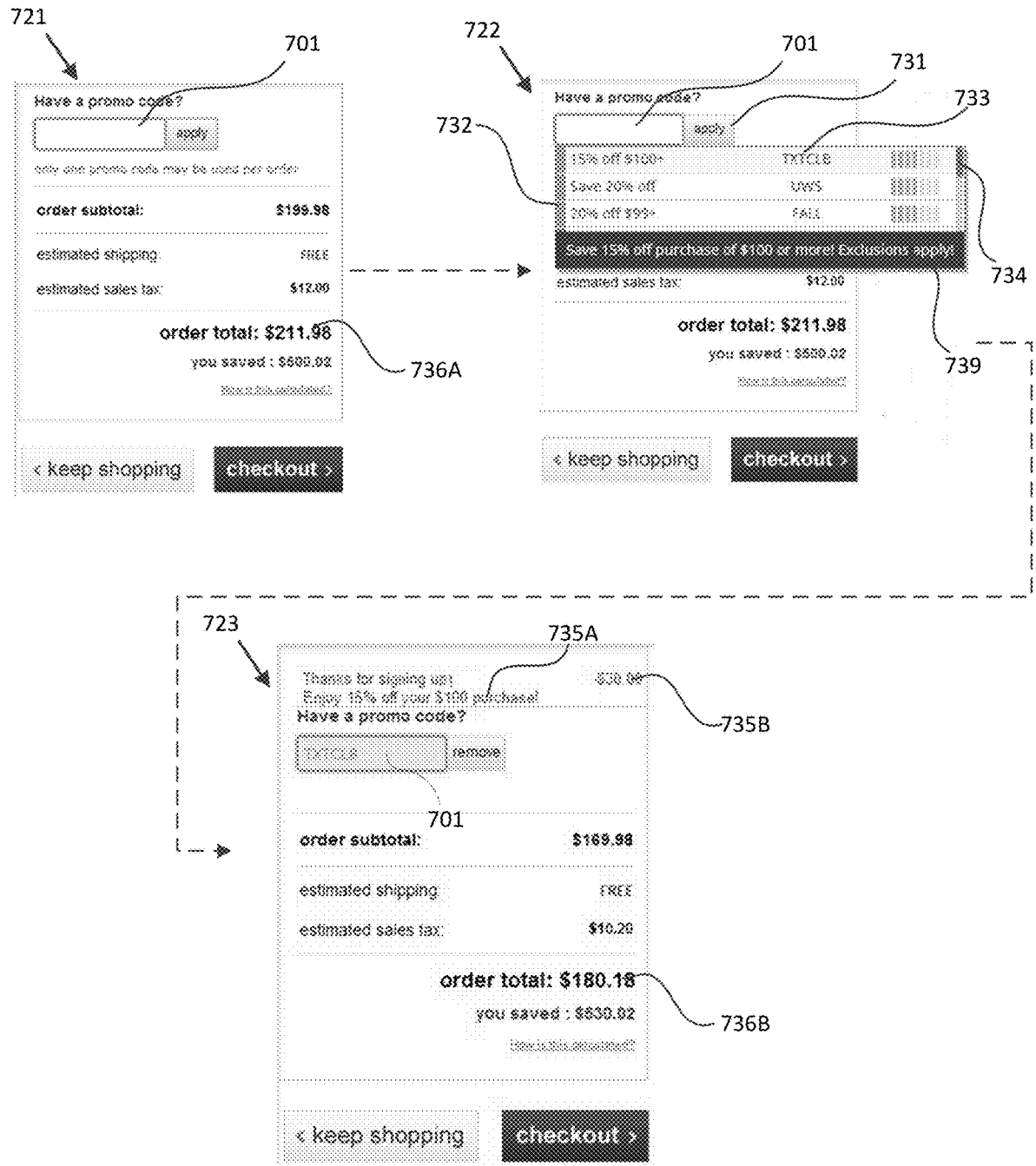

At block 405, browser extension 321 or browser 311 renders a GUI element—such as a GUI panel rendered, e.g., near the engaged BC code input field 701, with the GUI panel displaying acquired BC codes—that is configured to display information about the acquired or finalized BC codes and let the user select one or more acquired BC codes. FIG. 7D, in illustrating block 405 (as well as block 406), displays three pictorials showing a sequence of exemplary UIs surrounding block 405.

Specifically, UI 721 shows a UI displayed by the e-commerce site 130 before block 405 is performed. As shown, UI 721 includes an unfilled identified BC code input field 701. At block 405, UI 721 proceeds to UI 722 where an example of the GUI element 732—namely, GUI panel 732—is displayed immediately below the identified BC code input field 701. GUI panel 732 includes a UI list listing acquired or finalized BC codes, with each list entry 733 displaying information about a corresponding acquired or finalized BC code, such as the text of the corresponding BC code and an abbreviated, condensed, or summarized term description of the BC code. In one implementation, list entries 733 in the UI list are listed in an order of relevance (e.g., decreasing relevance) according to respective rankings of their corresponding BC codes determined by either browser extension 321 of the client device 101 (via, e.g., block 525) or backend system 140. Thus, list entries corresponding to the most or more relevant BC codes may be listed at or near the top of the UI list, while list entries corresponding to the least or less relevant BC codes may be listed at or near the bottom of the UI list. This facilitates the user to select and apply BC codes most relevant to the user's current order. In one implementation, if the user rests a mouse cursor on a list entry 733, the bottom section 739 displays more a detailed term description of the BC code corresponding thereto. A scroll bar 734 may be provided to scroll the UI list to allow the user to view one or more list entries not visible within the "real estate" screen space occupied by GUI panel 732.

The GUI element 732 rendered to display information about the acquired BC codes (such as GUI panel 732) may be displayed anywhere. In one implementation, the GUI element 732 is of a size not taking up a significant portion of the user's screen real estate or blocking potentially necessary information. In one implementation, the GUI element 732 is approximately 120 pixels in height, and is 405 pixels in width. The content area may be dependent on the resolution of the video display terminal and the size which the user has set for browser 311 on client device 101. The engaged BC code input field 701 may itself be used to detect the user's current viewport since the input field must always be initially shown at a visible area of browser 311 in order to allow the user to engage it. A skilled artisan appreciates that this can be accomplished by browser extension 321 obtaining such viewport information through browser 311 (as such information is usually available to browser 311).

In one implementation, browser extension 321 may render the GUI item 732 using a device context (such as a graphics device context) provided by browser 311 and the acquired information about the requested BC codes of the e-commerce site 130. In one implementation, browser extension 321 may inject HTML code (which may include JavaScript code 322 or other scripting code 322) directly into the identified BC context, with the injected HTML code filled with information about the acquired BC codes, and when rendered, displaying the GUI item 732. In one implementation, the injected HTML code may be dynamically downloaded from DS 210 of backend system 140 or DS 330 of client device 101.

For the above-noted IFrame-based HTML injection implementation, as a skilled artisan appreciates, browser 311 receives information about the one or more return BC codes in the form of a set of returned HTML code (which may include JavaScript code 322 or other scripting code 322). The returned HTML code, when rendered by browser 311, results in the GUI item 732 being displayed. In particular, the displayed GUI item 732 is pre-created by or otherwise originated from backend system 140. Thus, for the above-noted IFrame-based HTML injection implementation, browser 311 works in concert with backend system 140 to perform block 405. In other words, the above-noted IFrame-based HTML injection implementation does not require or involve browser extension 321 in order to perform block 405. Hence, as a skilled artisan appreciates, the above-noted IFrame-based HTML injection implementation has an advantage of not requiring and making a user to constantly upgrade browser extension 321 to a new version each time when there is a need to update the GUI item 732 in order to, e.g., optimize the user experience through things like usability testing to determine the most beneficial way to showcase, e.g., coupons to a user.

At block 406, browser extension 321 inputs the user-selected one or more BC codes (listed in the GUI element 732) into an identified BC code input field 701. Simplified code snippets 3 and 4 illustrated in FIG. 7F show one or more exemplary implementations of block 406. Specifically, browser extension 321 is so configured that when the user selects a BC code from the list displayed in the GUI item 732 (by, e.g. clicking the mouse when the mouse cursor is rested on the list entry corresponding to the selected BC code), browser extension 321 receives the selection event and subsequently handles the selection event. In handling the selection event, browser extension 321 retrieves the text of the selected BC code from the data included in the received selection event, and inputs the retrieved text of the selected BC code into the identified BC code input field 701.

With a selected code now in the BC code input field, the user may then apply the selected BC code against the e-commerce server 130 by, e.g., clicking an "apply" button 731 next to the identified BC code input field 701, as shown in UI 722 of FIG. 7D. The clicking of the "apply" button 731 may lead to UI 723 exemplified in FIG. 7D when the application of the selected BC code is successful. This success of applying the selected BC code is indicated and reflected by text 735B showing saving amount, text 735A showing a message announcing the saving materialized, and text 736B showing the reduced total price of the current order (as compared to previously displayed text 736A showing the total price of the current order before the selected BC code is applied. As such, with some or all of blocks 401-406, an in-context automated delivery of BC codes is achieved, with the user possibly gaining savings in an on-line transaction with the e-commerce site 130.

Figure 7E:
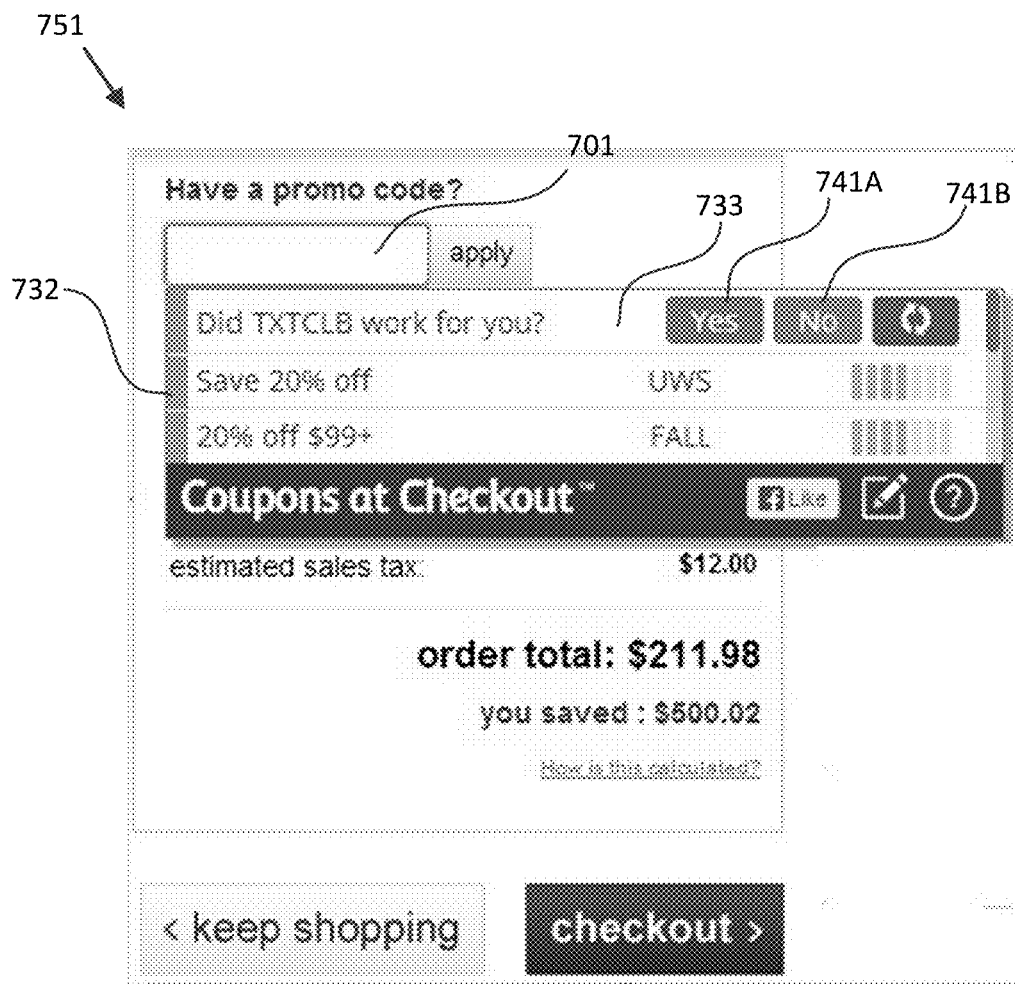

At block 407, browser extension 321 receives user feedback on one or more BC codes which the user has selected through the GUI element 732 and may have later applied against the e-commerce site 130, and transmits the received user feedback to backend system 140. FIG. 7E is a pictorial illustrating an UI 751 used to implement block 407. As shown in FIG. 7E, following one or more user selections of a BC code, when the user, e.g., re-engages an identified BC code input field 701, browser extension 321 renders the GUI item 732 such that the listing entry corresponding a previously selected BC code displays two clickable feedback UI elements 741A and 741B for the user to select so as to provide feedback on the effectiveness/ineffectiveness (or the validity/invalidity) of the previously selected BC code.

The GUI item 732 shown in FIG. 7E may be implemented using same or similar implementations of the GUI item 732 shown in FIG. 7D, as described above in connection with block 405. As the user selects either UI element 741A or 741B (by, e.g., tapping or clicking UI element 741A or 741B), the selection, which corresponds to the user feedback on the effectiveness (or the validity) of the previously selected BC code, browser extension 321 (or scripting module 322), via one or more implementations same as or similar to those described above in connection with block 406, receives the selection information. As appreciated, the user's selection of UI element 741A indicates the user's feedback that the previously selected BC code (which, in this case, is "TXTCLB") is effective (or valid). The user's selection of UI element 741B indicates the user's feedback that the previously selected BC code is ineffective (or invalid). Thus, through receiving the user's selection of either UI element 741A or UI element 741B, browser extension 321 (or scripting module 322) receives the user's feedback on the previously selected BC code. Browser extension 321 (or scripting module 322) then sends the user's feedback on the previously selected BC code to backend system 140 through, e.g., a message including information indicating the received user's feedback on the previously selected BC code.

Figure 6:
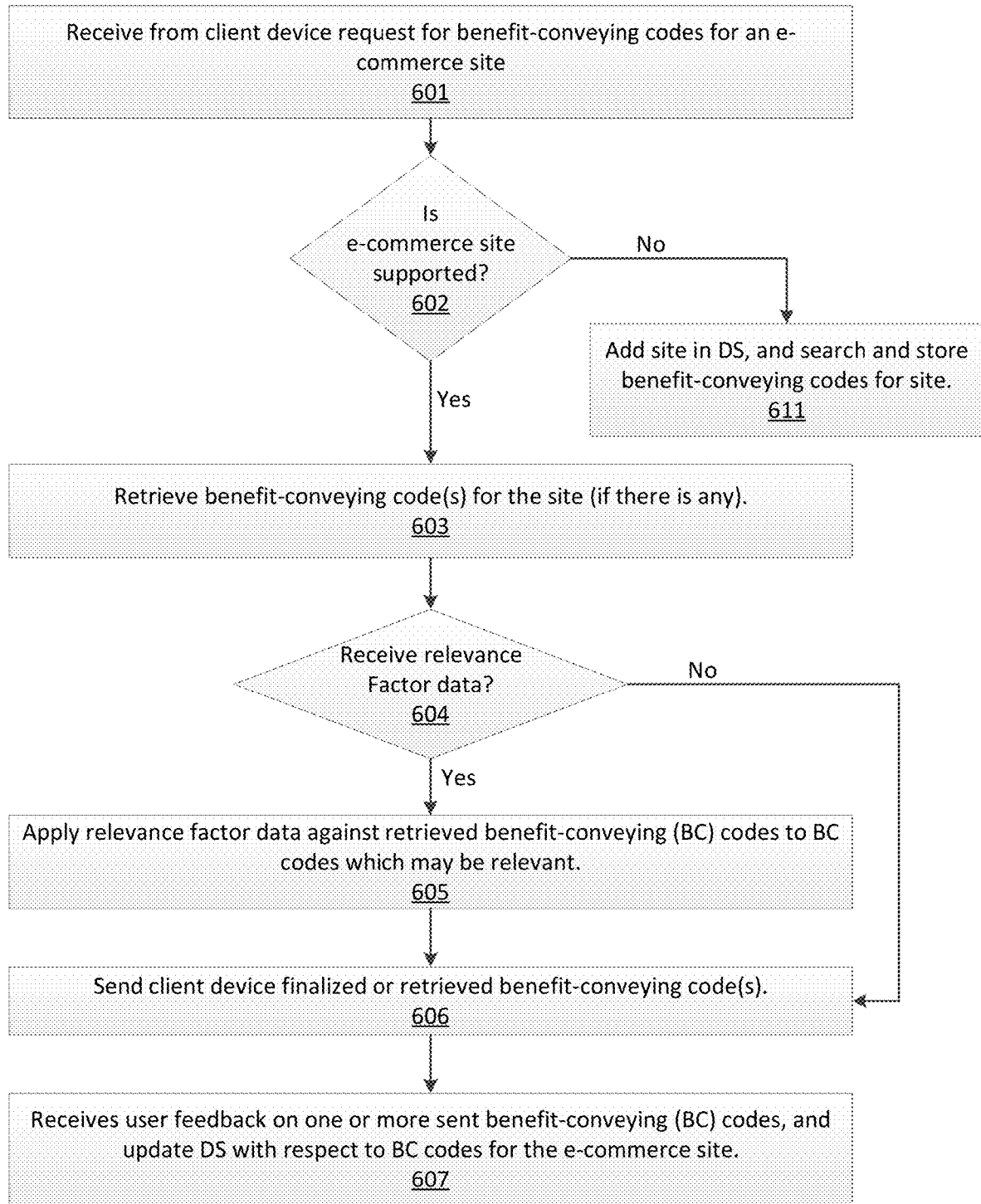
FIG. 6 is a flowchart illustrating an exemplary process performed by the backend system of the disclosed system and method as part of a process of achieving an in-context automated delivery of relevance-checked benefit-convey codes of an e-commerce website, according to one or more embodiments of the present disclosure.

FIG. 6 is a flowchart illustrating an exemplary process performed by backend system 140 of the disclosed system and method as part of a process of an in-context automated delivery of relevance-checked benefit-conveying codes of an e-commerce website, according to one or more embodiments of the present disclosure.

At block 601, backend system 140, via, e.g. web server module 221, receives from a client device 101 a request for BC codes of an e-commerce website 130. In one implementation, block 601 corresponds to block 501 of FIG. 5A.

At decision 602, backend system 140, via, e.g. server app 222 and DS 210, checks whether the e-commerce website 130—whose domain name information, in one implementation, is included in the received request, as described above in connection with block 501—is supported by backend system 140.

In one implementation of decision 602, DS 210 stores a collection of domain name entries listing respective domain names of e-commerce websites that are supported (or, in other words, covered) by backend system 140. Thus, if the collection of domain name entries of DS 210 does not include an entry listing the domain name of the e-commerce website 130, the e-commerce website 130 is found not supported by backend system 140. Otherwise, in which case the collection of domain name entries includes an entry listing the domain name of the e-commerce website 130, the e-commerce website 130 is found supported by backend system 140.

If, at decision 602, the e-commerce website 130 is found not supported by backend system 140, backend system 140, via, e.g. server app 222, proceeds to block 611, where backend system 140 adds the e-commerce website 130 to the list of e-commerce websites that are supported by backend system 140. In one implementation, the domain name of the e-commerce website 130 is added to the aforementioned collection of domain name entries of DS 210 via server app 222.

At the same block 611, backend system 140, in addition to adding the e-commerce website 130 to its list of supported e-commerce websites, searches BC codes of the e-commerce website 130 and stores the discovered BS codes (through the searching) in DS 210 corresponding to, e.g., the domain name of the e-commerce website 130. In one implementation, the searching and storing may be performed by one or more cron jobs invoking known routines (e.g. APIs or algorithms) used by conventional BC code aggregator systems or vendors to search, e.g., the e-commerce website 130, email newsletters, social media, websites, datafeeds or blogs, for BC codes of the e-commerce website 130. When one or more BC codes are discovered through the searching, the cron jobs may communicate with DS 210 so as to store the discovered BC codes (corresponding to the e-commerce website 130) using, e.g., built-in database APIs provided by DS 210.

As a skilled artisan appreciates, decision 602 and block 611 work in concert to achieve an automated means to automatically detect an e-commerce website which has not been supported (tracked) for collecting benefit-conveying codes, and add the e-commerce website into the "supported e-commerce websites" list of backend system 140. With the automated means, backend system 140 may automatically and programmatically expand its coverage of e-commerce websites for the benefit-conveying code aggregation and provision purposes, which is an advantageous feature that, to Applicant's knowledge, not available in conventional BC code aggregator systems or vendors.

If, at decision 602, the e-commerce website 130 is found supported by backend system 140, backend system 140, via, e.g. server app 222, proceeds to block 603, where backend system 140, via, e.g. server app 222, retrieves BC codes for the e-commerce website 130 from DS 210.

At decision 604, backend system 140, via, e.g., server app 222, checks whether relevance factor data (associated with the received BC code request) is received from client device 101. In one implementation, backend system 140, via, e.g., server app 222, checks whether there is relevance factor data included in the received request. In one implementation, backend system 140, via, e.g., web server module 221 and server app 222, waits for the client device 101 to send relevance factor data (collected, e.g., by browser extension 321 of client device 101) within a pre-defined time period following the receiving of the request. If backend system 140 receives separately sent relevance factor data within the pre-defined time period, relevance factor data is deemed received.

If, at decision 604, backend system 140 decides that relevance factor data for the received BC code request is received, backend system 140, via, e.g. server app 222, proceeds to block 605, where backend system 140, via, e.g. server app 222, applies the received relevance factor data against the retrieved BC codes so to finalize BC codes which is determined as possibly relevant according to the applied relevance factor data. This applying of relevance factor data may be implemented using same or similar implementations of block 524, as described above in connection with block 524. Additionally, block 605 may further include ranking the finalized BC codes in an order of relevance, using same or similar implementations of block 525, as described above in connection with block 525. Following block 605, backend system 140 proceeds to block 606.

If, at decision 604, backend system 140 decides that relevance factor data is not received for the received BC code request, backend system 140, via, e.g. server app 222, proceeds directly to block 606.

At block 606, backend system 140, via, e.g. web server module 221 and server app 222, sends one or more finalized or retrieved BC codes to the client device 101. Block 606 may correspond to any one of block 502, block 523, or both. In one implementation, backend system 140 may send the finalized or retrieved BC codes in one of several forms corresponding to one of several forms of receiving requested BC codes, as describe above in connection with implementations of block 502.

At block 607, backend system 140, via, e.g. web server module 221 and server app 222, receives from the client device 101 user feedback on one or more BC codes (previously sent to client device 101 at block 606), as a result of block 407 of FIG. 4 being performed by the client device 101. Upon receiving the user feedback, backend system 140, via, e.g., server app 222, updates DS 210 with respect to the one or more BC codes which the received user feedback targets. In one implementation, if the received user feedback indicates that the one or more target BC codes is ineffective or invalid, sever app 222 communicates with DS 210 so as to, e.g., down vote, inactivate, flag as "not working", or remove (from the collection of BC codes of the e-commerce site 130), the one or more target BC codes.

A skilled artisan appreciates that the above-described block 607, block 407 and UI 751 (illustrated in FIG. 7E) collectively achieve an automated means to collect user feedbacks on one or more BC codes of an e-commerce website and update BC code collection of the e-commerce website with the collected user feedback. This automated means results in timely and automatic updating and refreshing the BC code collection of the e-commerce website stored in the backend system 140 following an in-context automated delivery of BC codes. This is an advantageous feature that, to Applicant's knowledge, is not available in conventional BC code aggregator systems or vendors.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof.

Therefore, it is intended that the disclosure not be limited to the particular embodiments disclosed for carrying out this disclosure, but that the disclosure will include all embodiments falling within the scope of the appended claims.

What is claimed is:

1. A method, performed by a browser application running in a communicable client computing device of a user via a callable routine set of one or more routines callable by the browser application, for automating an in-context delivery of one or more benefit-conveying (BC) codes of an e-commerce site when the user is performing an online shopping session through a series of web pages provided by, or otherwise affiliated with, the e-commerce site using the browser application, the client computing device comprising a processor, a memory, and a network interface device for communication through one or more communication networks, the client computing device communicable with a backend server having access to one or more databases storing BC codes of a plurality of e-commerce sites, the method comprising steps of:

identifying, through calling one or more routines of the callable routine set, a current web page as a BC context for the e-commerce site displayed by the browser application during the online shopping session, the current web page containing such first information about a current purchase order made during the online shopping session that the current web page is identified as the BC context that includes a BC code input field;

receiving, through calling one or more routines of the callable routine set, BC code information about one or more BC codes of the e-commerce site from the backend server prior to any text input having been entered into the BC code input field by the user through typing, the received BC code information including the one or more BC codes of the e-commerce site;

detecting, through calling one or more routines of the callable routine set, whether the user is engaging the BC code input field based on one or more user inputs received by the client computing device;

prior to any text having been input entered into the BC code input field by the user through typing, upon detecting that the user is engaging the BC code input field, displaying, through calling one or more routines of the callable routine set, a selection GUI panel within the display of the BC context along with the BC code input field being displayed in the BC context, the selection GUI panel adapted to render there-inside the received BC codes displayed and selectable in such a user-interactive manner that upon selection of a first BC code of the displayed BC codes by the user, the selected first BC code is programmatically inputted into the BC code input field for the user to apply; and wherein each of the received one or more BC codes has been relevance-checked prior to having been displayed such that the respective BC code has been subject to, and has survived, at least one relevance-checking operation performed thereon against at least one portion of substantive content of the current purchase order prior to the respective BC code having been displayed.

2. The method of claim 1, wherein the callable routine set is included in a plug-in module of the browser application.

3. The method of claim 1, wherein the receiving of, from the backend server, the BC code information about the displayed one or more BC codes is performed after the detecting of whether the user is engaging the BC code input field.

4. The method of claim 1, wherein the respective at least one relevance-checking operation, to which each of the received one or more BC codes has been subject, is performed through calling one or more routines of the callable routine set by the client computing device.

5. The method of claim 1, wherein the respective at least one relevance-checking operation, to which each of the received one or more BC codes has been subject, is performed by the backend server, upon receiving, from the client computing device, the at least one portion of the substantive content of the purchase order as a result of the browser application calling one or more routines of the callable routine set.

6. The method of claim 2, wherein the plug-in module comprises at least one of a browser extension, a browser add-on, an applet, an ActiveX control, a bookmarklet, and a callable scripting module.

7. The method of claim 1, wherein the receiving of the BC code information about the one or more BC codes comprises:

sending, to the backend server, a code request for providing BC codes of the e-commerce site; and receiving, from the backend server, the BC code information about the one or more BC codes of the e-commerce site sent by the backend server in response to the receiving of the code request.

8. The method of claim 5, wherein the receiving of the BC code information about the one or more BC codes of the e-commerce site, comprises:

collecting from the substantive content of the current purchase order, through calling one or more routines of the callable routine set, a set of relevance data for one or more specific relevance factors which may be used to determine whether a later retrieved BC code may be relevant to the current purchase order; and sending, through calling one or more routines of the callable routine set, the collected relevance data to the backend server, so that backend server uses the collected relevance data to determine whether a currently retrieved BC code of the e-commerce site retrieved from the one or more databases is relevant to the current purchase order, in deciding whether the currently retrieved BC code should be included in the BC code information to be sent from the backend server to the client computing device.

9. The method of claim 8, wherein the one or more specific relevance factors include at least one of a total value relevance factor, one or more product-specific relevance factors, one or more brand-specific relevance factors, and one or more category-specific relevance factors.

10. The method of claim 8, wherein the one or more BC codes of the e-commerce site received from the backend server, are ranked based on respective relative relevance thereof by the backend server, and the received BC code information includes information about the ranking.

11. The method of claim 1, wherein the received BC code information further includes, for each of the one or more BC codes included therein, a respective description of the respective BC code.

12. The method of claim 1, wherein the GUI panel is hidden from the display of the BC context once the selected first BC code is programmatically inputted into the BC code input field for the user to apply.

* * * * *